United States Patent
Smits et al.

(10) Patent No.: US 10,489,850 B2
(45) Date of Patent: Nov. 26, 2019

(54) MULTI-TENANT SUPPLY CHAIN PROVISIONING SYSTEMS AND METHODS

(71) Applicant: Open Text SA ULC, Halifax (CA)

(72) Inventors: Gerrit Smits, Amersfoort (NL); Marius Roelof van de Veen, Nijkerk (NL)

(73) Assignee: OPEN TEXT SA ULC, Halifax (CA)

(*) Notice: Subject to any disclaimer, the term of this patent is extended or adjusted under 35 U.S.C. 154(b) by 592 days.

(21) Appl. No.: 14/994,566

(22) Filed: Jan. 13, 2016

(65) Prior Publication Data

US 2016/0203544 A1 Jul. 14, 2016

Related U.S. Application Data

(60) Provisional application No. 62/102,969, filed on Jan. 13, 2015.

(51) Int. Cl.
*G06Q 30/00* (2012.01)
*G06Q 30/06* (2012.01)

(52) U.S. Cl.
CPC ........ *G06Q 30/0635* (2013.01); *G06Q 30/06* (2013.01); *G06Q 30/0601* (2013.01); *G06Q 30/0603* (2013.01); *G06Q 30/0623* (2013.01)

(58) Field of Classification Search
CPC .......... G06Q 30/0635; G06Q 30/0623; G06Q 30/0603; G06Q 30/0601; G06Q 30/06
USPC .................................................... 705/26, 27
See application file for complete search history.

(56) References Cited

U.S. PATENT DOCUMENTS

| | | | |
|---|---|---|---|
| 6,263,317 B1* | 7/2001 | Sharp | G06Q 30/06 705/26.81 |
| 8,112,317 B1 | 2/2012 | Ballaro et al. | |
| 9,245,291 B1 | 1/2016 | Ballaro et al. | |
| 2004/0015391 A1* | 1/2004 | Dupreez | G06Q 30/06 705/37 |
| 2004/0267674 A1* | 12/2004 | Feng | G06Q 30/0278 705/400 |
| 2005/0044099 A1 | 2/2005 | Soares et al. | |
| 2009/0182592 A1* | 7/2009 | Ballaro | G06Q 10/087 705/26.81 |
| 2009/0282045 A1* | 11/2009 | Hsieh | G06F 21/6218 |
| 2010/0063959 A1 | 3/2010 | Doshi et al. | |
| 2013/0204716 A1* | 8/2013 | Rehman | G06Q 30/0601 705/14.73 |

(Continued)

OTHER PUBLICATIONS

Bridgeline Digital Inc at LD Micro Conference—Final Fair Disclosure Wire [Linthicum] Dec. 6, 2012; Dialog #1270777329; 12pgs. (Year: 2012).*

(Continued)

*Primary Examiner* — Robert M Pond
(74) *Attorney, Agent, or Firm* — Sprinkle IP Law Group

(57) ABSTRACT

A provisioning system for a multi-tenant platform including a presentation component operably coupled to a supervisory component and a registry database and configured to present registry information in accordance with criteria defined in one or more rules and receive requests to access the registry information. The one or more rules define a supply chain including multiple of a plurality of tenants in the multi-tenancy system, the supervisory component configured to automatically implement the supply chain in response to the request.

20 Claims, 29 Drawing Sheets

(56) References Cited

U.S. PATENT DOCUMENTS

| | | | | |
|---|---|---|---|---|
| 2014/0279294 A1* | 9/2014 | Field-Darragh | ..... | G06Q 10/087 |
| | | | | 705/28 |
| 2015/0012382 A1* | 1/2015 | Ceribelli | ............ | G06Q 30/0609 |
| | | | | 705/26.35 |
| 2015/0363872 A1* | 12/2015 | Weinhold | ........... | G06Q 30/0641 |
| | | | | 705/14.23 |
| 2016/0203538 A1 | 7/2016 | Smits et al. | | |

OTHER PUBLICATIONS

Extended European Search Report issued for European Patent Application No. 16 151 065.6, dated May 19, 2016, 7 pages.

Examination Report issued for European Patent Application No. 16 151 065.6, dated Dec. 1, 2017, 9 pages.

Summons to Attend Oral Proceedings Pursuant to Rule 115(1) EPC issued for European Patent Application No. 16151065.6, dated Jul. 6, 2018, 12 pages.

Office Action issued for U.S. Appl. No. 14/994,562, dated Nov. 8, 2018, 28 pages.

Office Action issued for U.S. Appl. No. 14/994,562, dated Mar. 21, 2019, 33 pages.

Notice of Allowance issued for U.S. Appl. No. 14/994,562, dated Jul. 15, 2019, 17 pages.

\* cited by examiner

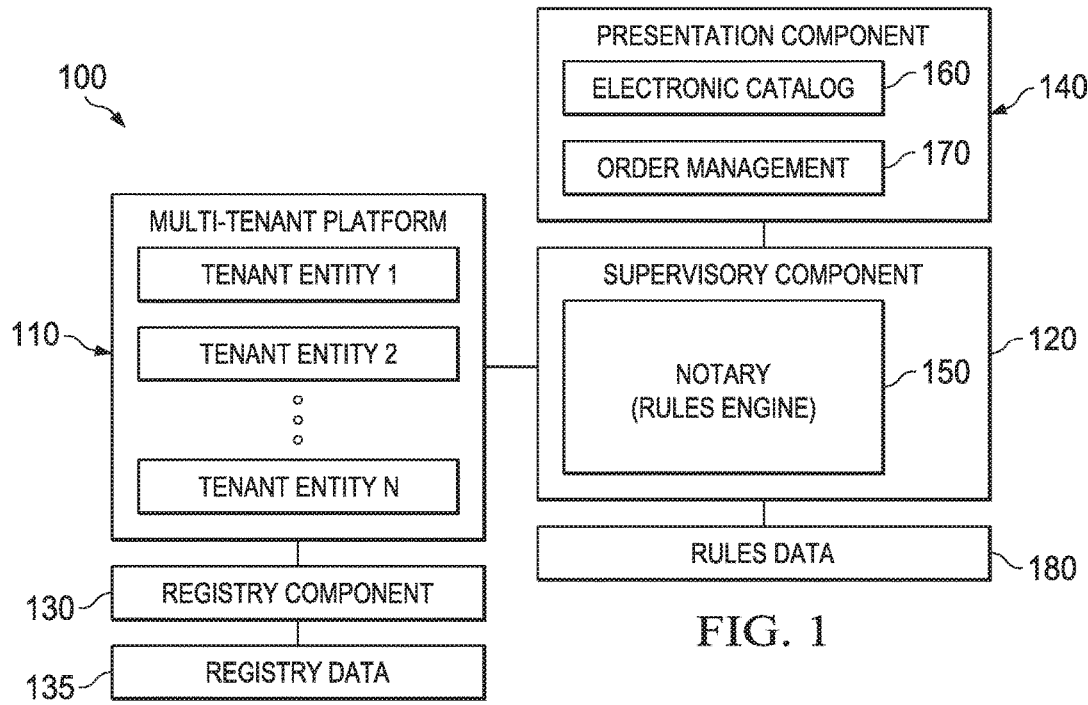
FIG. 1
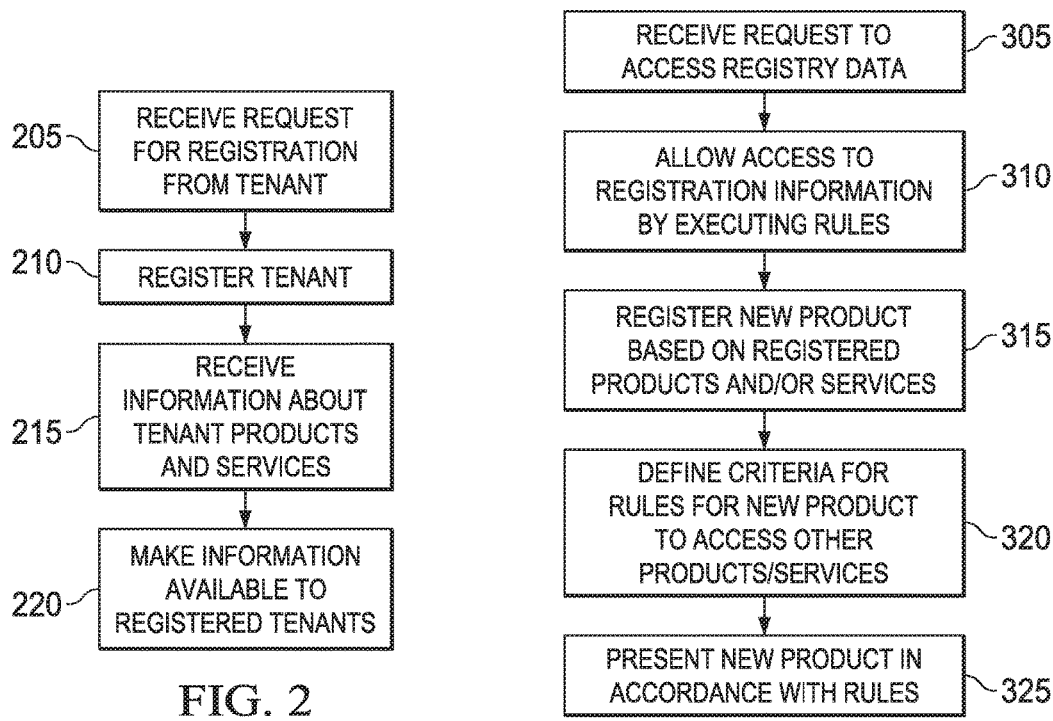
FIG. 2
FIG. 3

MULTI-TENANT SUPPLY CHAIN PROVISIONING SYSTEMS AND METHODS

CROSS-REFERENCE TO RELATED APPLICATION(S)

This is a conversion of, and claims a benefit of priority from U.S. Provisional Application No. 62/102,969, filed Jan. 13, 2015, entitled "SYSTEM AND METHOD FOR PRODUCT FULFILLMENT IN A CLOUD-BASED MULTI-TENANCY SYSTEM," the entire disclosure of which is fully incorporated by reference herein. This application relates to a co-pending U.S. patent application Ser. No. 14/994,562, filed Jan. 13, 2016, entitled "SYSTEMS AND METHODS FOR PRODUCT FULFILLMENT IN A CLOUD-BASED MULTI-TENANCY SYSTEM," which is fully incorporated by reference herein and which also claims a benefit of priority from U.S. Provisional Application No. 62/102,969, filed Jan. 13, 2015, entitled "SYSTEM AND METHOD FOR PRODUCT FULFILLMENT IN A CLOUD-BASED MULTI-TENANCY SYSTEM."

TECHNICAL FIELD

This disclosure relates generally to multi-tenancy systems and architecture. Embodiments disclosed herein relate to service provisioning in conjunction with such systems and, in particular, to product composition and fulfillment in cloud-based multi-tenancy systems.

BACKGROUND OF THE RELATED ART

In computing, multi-tenancy refers to a software architecture in which a single software instance of a computer program runs on a server and serves multiple tenants. A tenant, in this multi-tenant architecture, refers to a group of users who, with tenant-specific privileges, have access to this software instance. In the multi-tenant architecture, a software application may provide every tenant a dedicated share of a software instance, including application data, configuration, user management, tenant-specific functionality and non-functional properties.

In a conventional multi-tenant system, data from multiple tenants are stored on the same server. However, tenants are separate and isolated from one another via a partition mechanism that prevents the data from migrating from one tenant to another. Generally, tenants of a conventional multi-tenant system do not share data with other tenants and have no access to other tenants' data.

SUMMARY

The inventive systems and methods disclosed herein provide for tenants in a cloud-based multi-tenant system to share information and participate in a supply chain. One aspect is directed to enabling access to shared data by different tenants having a relationship. As discussed above, traditional multi-tenant systems enforce isolation among tenants, so that data sharing or following a link to data of a different tenant is not possible. This disclosure addresses this and other technical problems such that registry information is accessible by a plurality of tenants in a multi-tenant system, while taking advantages of the many benefits provided by the multi-tenant system, including cost savings, centralized software distribution/upgrade, flexibility, scalability, high performance, low operation costs, etc.

Tenants in a multi-tenant system disclosed herein may include a supplier such as a developer or owner who registers products or services they offer (and define properties and/or characteristics thereof). The tenant may also include a product manager who composes products or services into a new value-added product (or service). Such a product manager may, for example, define the components of the product or service and their properties and/or characteristics. Such a product or service can be made available through an electronic catalog provided or hosted by a multi-tenant system disclosed herein. A product or service listed/referenced in the electronic catalog may have predefined rules and/or policies associated therewith. Another tenant, such as a sales representative or a reseller, may offer a set of products and/or services to customers through the electronic catalog in accordance with one or more of the predefined rules and/or policies associated therewith. Another tenant, also known as a subscriber or customer, may browse the electronic catalog and order an item (a product or a service) which, in some cases, can be a composite of multiple product offerings. The system can decompose an order into its constituent components and causes them to be automatically fulfilled in a managed chain.

Some embodiments of a system may include a registry component embodied on non-transitory computer memory including instructions executable by a processor to: receive a request for registration from a first tenant of a multi-tenant system operating on a multi-tenant computing platform; register the first tenant in response to the request for registration; receive from the first tenant information about items offered by the first tenant; and store the information about the items in association with the first tenant in a registry database, the registry database storing registry data on products, services, or a combination thereof offered by registered tenants of the multi-tenant system. In some embodiments, the registry component is configured for determining whether to register the first tenant based on predetermined registration requirements (e.g., valid tenant status, etc.). The items offered by the first tenant may include software product(s) and/or services, for instance, data storage, computing services, data center services, printer services, or email services, etc.

The system may further include a supervisory component operably coupled to the registry component and to a rules database. The supervisory component may be configured for enforcing rules for accessing the registry data associated with the registered tenants of the multi-tenant system. The rules may define criteria/terms/conditions (collectively, criteria) by which the registry information is accessible by tenants in the multi-tenancy system. For example, the rules may define a period for selling a product or service, a price of a product or service, a volume of the product or service, etc. The rules may also define a supply chain involving multiple tenants in the multi-tenant system. The supervisory component may execute one or more rules upon receiving a request from a registered tenant to access the registry data. As explained below, the supervisory component can be configured to automatically implement a supply chain in response to such a request.

The system may further include a presentation component operably coupled to the supervisory component and to the registry database and configured for presenting the registry data to registered tenants of the multitenant system in accordance with applicable rules and for receiving requests to access the registry data. In some embodiments, the presentation component may receive an order from a second tenant for an item offered by a first tenant and communicates the order to the supervisory component. The supervisory component may automatically implements execution of the order and delivery or availability of the item to the second tenant. In some embodiments, this may entail decomposing the order into multiple product offerings including a first product offering by the first tenant and a second product offering by a third tenant; creating a sub order containing the second product offering by the third tenant; and communicating the sub order to the third tenant.

In some embodiments, the presentation component is further configured for presenting an electronic catalog referencing the items offered by the first tenant. The electronic catalog may be accessible by the second tenant in accordance with one or more rules associated with the item offered by the first tenant. While information received from tenants may be in disparate forms and/or formats, items are presented in the electronic catalog in accordance with a uniform or common standard.

In some embodiments, at least one rule is received from the first tenant. The at least one rule may define accessibility of the information about the items offered by the first tenant by one or more tenants of the registered tenants of the multi-tenant system. As such, the supervisory component can be further configured for determining accessibility of a tenant of the multi-tenant system to the information about the items offered by the first tenant in accordance with the at least one rule associated with the first tenant.

In some embodiments, a method may include receiving a request for registration from a first tenant of a multi-tenant system operating on a multi-tenant computing platform which can be a single computing platform having software and hardware supporting multiple tenants in isolation from others of the multiple tenants. The method may further include registering the first tenant in response to the request for registration; receiving from the first tenant information about items offered by the first tenant; and storing the information about the items in association with the first tenant in a registry database. The registry database may include registry data on products, services, or a combination thereof offered by registered tenants of the multi-tenant system. The method may further include presenting an electronic catalog containing the information about the items stored in the registry database, the electronic catalog accessible by a second tenant in the multi-tenant system in accordance with at least one rule associated with the first tenant. In some embodiments, the method may further include determining whether to register the first tenant based on some registration requirements.

In some embodiments, the method may further include receiving the at least one rule from the first tenant, the at least one rule defining accessibility of the information about the items offered by the first tenant by one or more tenants of the registered tenants of the multi-tenant system; and providing the second tenant with access to the information about the items offered by the first tenant in accordance with one or more criteria defined in the at least one rule from the first tenant. The second tenant may compose a new product offering based at least in part on an item offered by the first tenant. As such, in some embodiments, the method may further include, responsive to an instruction from the second tenant, composing or defining a new product offering for the second tenant; and presenting the new product offering in the electronic catalog. The new product offering is accessible by one or more of the registered tenants of the multi-tenant system in accordance with rules associated with the first tenant and the second tenant.

The second tenant may also order from the first tenant. As such, in some embodiments, the method may further include receiving an order from the second tenant for an item offered by the first tenant; and automatically implementing execution of the order and delivery or availability of the item to the second tenant. In some embodiments, this may include decomposing the order into multiple product offerings including a first product offering by the first tenant and a second product offering by a third tenant; creating a sub order containing the second product offering by the third tenant; and communicating the sub order to the third tenant. The final product is then delivered or made available to the second tenant.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein.

Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 1 depicts a diagrammatic representation of an example of an embodiment of a multi-tenant supply chain provisioning system disclosed herein;

FIG. 2 depicts a flowchart illustrating an example of a method of operation according to some embodiments;

FIG. 3 depicts a flowchart illustrating an example of a method of operation according to some embodiments;

DETAILED DESCRIPTION

Figure 4:
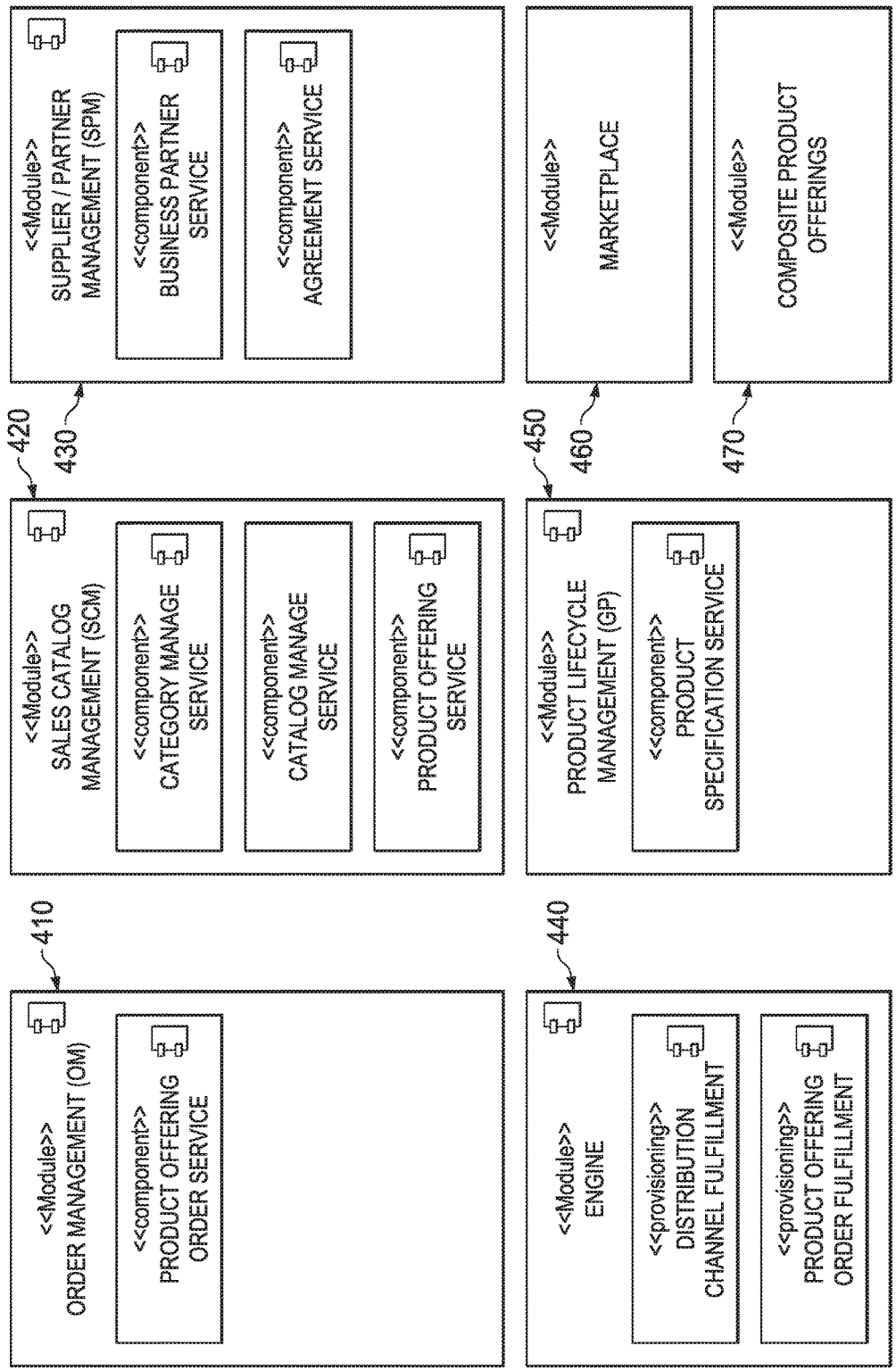
FIG. 4 is a diagrammatic representation of an example embodiment of an application according to some embodiments.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Turning now to FIG. 1, a diagram illustrating an example of a multi-tenant supply chain provisioning system is shown. In the example of FIG. 1, multi-tenant supply chain provisioning system 100 may include multi-tenant platform 110, supervisory component 120, registry component 130, and presentation component 140. Multi-tenant platform 110 may be a single computing platform offering services to a plurality of entities, such as Tenant Entity 1, Tenant Entity 2, . . . , Tenant Entity N (referred to hereinafter as "tenants"). A computing platform refers to a framework or infrastructure on which applications may be run and is known to those skilled in the art.

Multi-tenant platform 110 may include data about its tenants. In some embodiments, these tenants may be represented by users having certain roles, for instance, buyers, sellers, distributors, developers, product managers, sales representatives, suppliers, retailers, service providers, etc., in their respective organizations and/or in a supply chain. In some embodiments, a user representing a tenant may act in one or more of roles.

As will be discussed in greater detail below, embodiments of multi-tenant supply chain provisioning system 100 disclosed herein can provide an innovative mechanism by which information (e.g., data relating to a product/service offered by a tenant) may be shared among tenants. Furthermore, multi-tenant supply chain provisioning system 100 includes a plurality of modules/components/functions for processing/handling distributed buying/selling by its tenants. For example, in some embodiments, multi-tenant supply chain provisioning system 100 may automatically provide and implement a supply chain (e.g., implement execution and/or management of orders/product fulfillment in the supply chain) upon receiving a request from a tenant for a product or service offered by another tenant.

Tenants of multi-tenant supply chain provisioning system 100 may register with multi-tenant platform 110 via registry component 130. In some embodiments, registry component 130 may automatically register a tenant upon request. In some embodiments, registry component 130 may optionally implement a vetting process for qualifying a tenant for registration. For example, registry component 130 may determine whether to register a tenant based on some predetermined registration requirements and, where appropriate, register the tenant into the system.

Registry component 130 may receive register information ("registry data") from a registered tenant about their products and services. In some embodiments, the associated registry data may be stored in registry database 135 accessible by registry component 130. Examples of products and services may include software products and services, including, but are not limited to data storage, computing services, data center services, printer services, email services, etc.

In some embodiments, supervisory component 120 may include notary or rules engine 150 for defining and/or enforcing rules for accessing products and/or services being offered by registered tenants. Rules data may be stored in rules database 180 which is accessible by notary 150.

In some embodiments, presentation component 140 may operate to maintain electronic catalog 160 of items such as products and/or services being offered by registered tenants. Order management component 170 may include a user interface configured to allow registered tenants and, in some cases, consumers (e.g., visitors of a web site hosting electronic catalog 160) to order products and/or services from electronic catalog 160. In some embodiments, the user interface may be configured to allow product managers to compose products and services from other tenants into new products and services.

Supervisory component 120 may maintain rules in rules database 180 for controlling access to individual tenants' data. In additional to tenant-specific access control rules, rules stored in rules database 180 may include product details and supply chain rules for order fulfillment, for instance, a period for selling a product or service, a price of a product or service, a volume of a product or service, etc. Other types of rules may also be included. In some embodiments, supervisory component 120 may operate to supervise an order by implementing rules associated with a product or service in the order and taking appropriate actions to fulfill (complete) the order. This is further explained below.

Turning now to FIG. 2, a flowchart illustrating an example of a registration operation according to some embodiments is shown. In this example, a registry component of a multi-tenant supply chain provisioning system running on a multi-tenant platform (e.g., registry component 130 of multi-tenant supply chain provisioning system 100 shown in FIG. 1) may receive from a tenant entity (referred to herein as a tenant) a request for registration (205). In response, the registry component may register the tenant (210) and store the registry information in a registry database (e.g., registry database 135 of FIG. 1). This has the technical effect that a tenant is automatically registered. As discussed above, in some embodiments, the registry component may optionally determine whether the tenant meets certain criteria/registration requirements such as credit check and/or some other checks/processes, for instance, validation, security, compliance, system operation, etc., prior to registering the tenant.

Subsequently, the registry component may receive, from the tenant, information about the tenant's products or services (215). Once registered, a tenant may add products and services to their associated registry data at will. The registry component may store information received from each registered tenant in the registry database and a supervisory component (supervisory component 120 shown in FIG. 1) of the multi-tenant supply chain provisioning system may make the information available to other registered tenants (220). In some embodiments, making the information available to registered tenants may include establishing one or more rules concerning their availability and storing such rules in a rules database (e.g., rules database 180 shown in FIG. 1). In some embodiments, described below, rules governing tenant access rights (e.g., for one registered tenant to access information of another registered tenant based on some criteria/requirements that may be tenant-specific) may also be defined.

As seen in FIG. 3, the supervisory component may receive a request from a user (e.g., a product manager representing a registered tenant) to be granted the right to access the registry data of another tenant (305). The supervisory component may determine whether to grant the access right by executing one or more rules (e.g., a rule governing the access right of the requesting tenant) associated with the other registered tenant in the rules database (310). This has the technical effect that access is granted automatically to a registered tenant. If access is allowed, the supervisory component may pass control to the registry component. Suppose a product manager of one tenant is requesting the right to access information about another tenant, once granted, the product manager does not have to ask a second time to retrieve information about this other tenant. This has the technical effect that redundant checking of access information is avoided.

As an example, granted with access rights to other tenants' products and services, the product manager may compose a new product offering using product(s), service(s), or a combination thereof offered by the other tenant(s). In some embodiments, the product manager can compose product offerings of other tenants, but not solely or directly products/services of other tenants. The registry component may register this new product offering (315) based on the registered products and/or services. Such a product registration process may include defining criteria for rules for the new product offering to allow access to other products/services (320). Subsequently, the registered new product offering may be presented (e.g., by presentation component 140 shown in FIG. 1) in an electronic catalog (325) in accordance with applicable rules (e.g., a rule governing a length of time in presenting the new product offering via the electronic catalog, a rule governing locality where the new product offering may be available, etc.).

FIG. 4 illustrates in greater detail various example modules and subcomponents of a multi-tenant supply chain provisioning system in accordance with some embodiments. The example shown in FIG. 4 may be an implementation of the presentation and supervisory components of FIG. 1. In some embodiments, the system includes, order management module 410, sales catalog management module 420, supplier/partner management module 430, engine module 440, product lifecycle management module 450, marketplace module 460, and composite product offerings module 470.

In some embodiments, orders are received via marketplace module 460, triggering coordinated actions by other modules and subcomponents. For example, order management module 410 may be configured for processing/handling product offerings and product orders and for providing order management services such as a product offering order service (which is implemented as a subcomponent of the system, in this example).

In some embodiments, sales catalog management module 420 may be configured for providing catalog management services including a category manage service, a catalog manage service, and a product offering service. Sales catalog management module 420 defines categories and category hierarchies (including visibility), as well as product offerings including pricing, product basic offering categories, and valid period, etc.

In some embodiments, supplier/partner management module 430 may be configured for providing supplier/ partner management services including a partner service and an agreement service. In this disclosure, a partner can refer to a tenant. Supplier/partner management module 430 may define relationships between partners/tenants (e.g., using rules, which implement agreements between tenants), make catalogs available to partners (e.g., linking the catalogs to the agreements); and provide partner-centric services.

In some embodiments, engine module 440 may be configured for implementing the execution of orders in a supply chain. To do so, engine module 440 may include a distribution channel fulfillment component and a product offering order fulfillment component. The functionality of engine module 440 is further described below.

In some embodiments, product lifecycle management module 450 may be configured for providing product lifecycle management services including a product specification service for creating product specifications (e.g., product specifications with basic product categories).

In some embodiments, composite product offerings module 470 defines composite product offerings involving reselling of product offerings of other suppliers. In addition, it assigns product categories to product offerings and assigns product offerings to catalogs.

Figure 5:
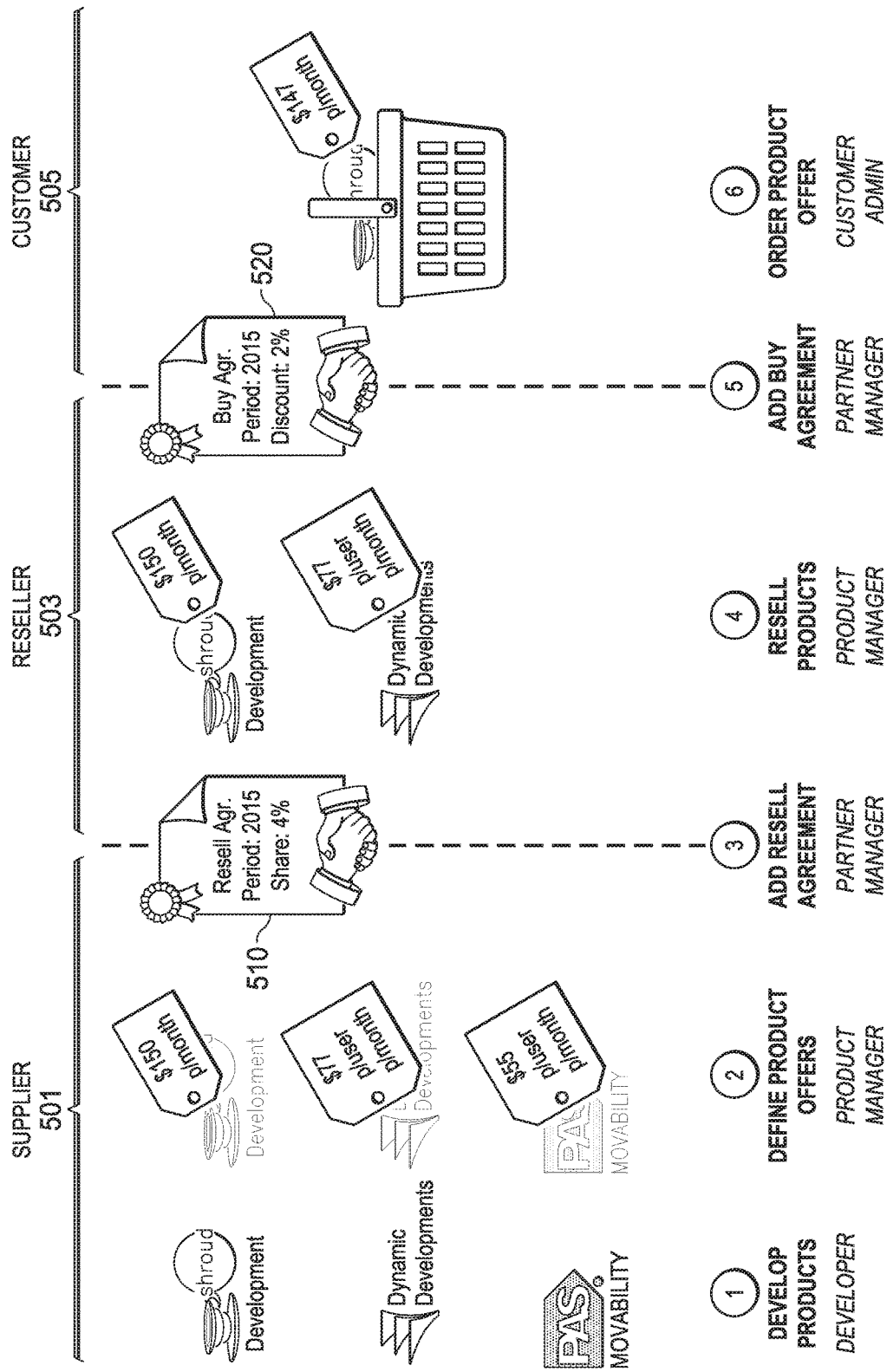
FIG. 5 depicts a diagrammatic representation of an example of system operation according to some embodiments.

Shown in FIG. 5 is an example of system operation according to some embodiments. In this example, three tenants of a multi-tenant supply chain provisioning system represent supplier 501, reseller 503, and customer 505. Supplier 501 may include a developer who develops products and a product manager who defines product offers. Reseller 503 may likewise include a product manager who defines composite product offerings. Customer 505 may include a customer administrator who orders products from a catalog (e.g., electronic catalog 160 of multi-tenant supply chain provisioning system 100 shown in FIG. 1). The relationships between supplier 501 and reseller 503 are defined by rules implementing resell agreement 510 while those between reseller 503 and customer 505 are defined by rules implementing buy agreement 520.

In the example illustrated, customer 505 browses the catalog (e.g., provided by marketplace module 460 shown in FIG. 4) and orders a product, such as a software development product, from reseller 530. A product order management (OM) module (e.g., order management module 410 shown in FIG. 4) validates the order. This may be done by consulting with a supplier/partner management (SPM) module (e.g., supplier/partner management module 430 shown in FIG. 4) to determine whether there is a valid agreement for this order between the two parties (i.e., customer 505 and reseller 530). Suppose the OM accepts the order, it then delegates processing to an engine module (e.g., engine module 440 shown in FIG. 4). The engine module then executes the order. In some embodiments, this entails the engine module decomposing the order and creating sub orders for each party involved. In this example, three tenants are involved, including supplier 501 that supplies the product which, per resell agreement 510, reseller 503 is able to sell to customer 505 per buy agreement 520. The engine module fulfills all the involved products (in this use case, one product). After the order from customer 505 has been fulfilled, customer 505 receives access to the software development product, for example, through an e-mail containing the connection details and username/password for logging into the software development product.

Figure 6:
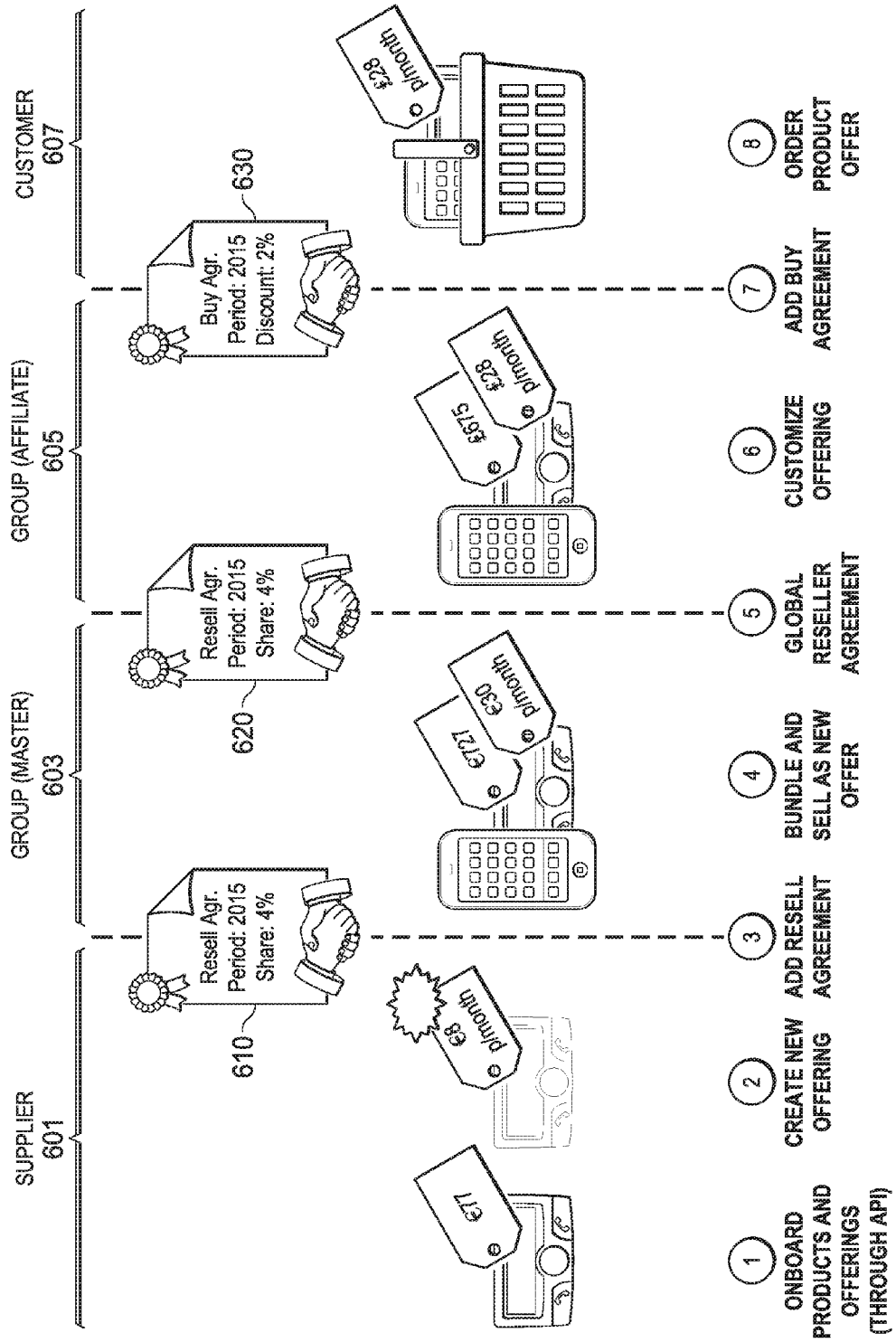
FIG. 6 depicts a diagrammatic representation of an example of system operation according to some embodiments.

FIG. 6 illustrates another example of system operation according to some embodiments. In this example, four tenants are involved, including supplier 601, group master 603, group affiliate 605, and customer 607. Supplier 601 may provide onboard offerings and products and may also create new products. Group master (owner) 603 may bundle such products and sell them as new offers. Group affiliate 605 may customize an offer by group master 603 and provide it in a catalog (e.g., electronic catalog 160 of multi-tenant supply chain provisioning system 100 shown in FIG. 1). Relationships between supplier 601 and group owner 603 are defined by rules implementing resell agreement 610; those between group owner 603 and group affiliate 605 are defined by rules implementing resell agreement 620; and those between customer 607 and group affiliate 605 are defined by rules implementing buy agreement 630.

Figure 7:
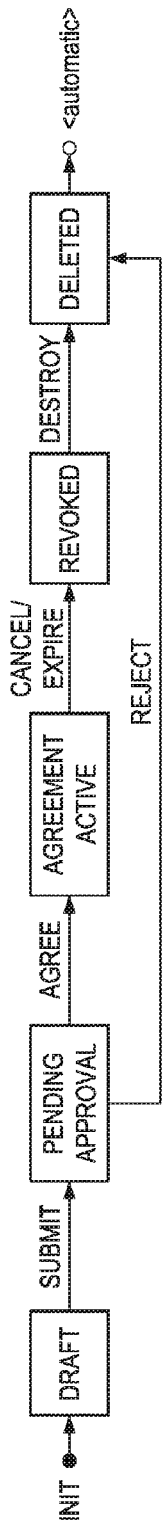
FIG. 7 depicts a diagrammatic representation of an example of a state machine for establishing a rules agreement according to some embodiments.

As noted above, relationships between parties may be defined by one or more agreements. Rules implementing such agreements may be maintained by or managed using an agreement service (e.g., a component of supplier/partner management module 430 shown in FIG. 4) or a rules engine (e.g., notary 150 shown in FIG. 1). The lifecycle of an agreement and its associated rules may proceed as shown in FIG. 7, which illustrates a rules/agreement state machine.

Initially, a draft of rules in an agreement is prepared. It may be prepared by one or the other of the parties, but in some embodiments, it can only be submitted by one. The non-submitting party must then validate and approve the proposed agreement or reject the agreement ("pending approval"). If approved, the agreement and rules associated therewith is active ("agreement active") until canceled or expired. The agreement may be revoked, i.e., canceled if all parties to the agreement agree. If so, the agreement is deleted. This has the technical effect that rules for accessing products and/or services for different parties are adapted automatically, i.e. the rules being enforced by the supervisory component depend on the state of the agreement. Accordingly, in some embodiments, product offerings are state controlled. This is further explained below.

Figure 8:
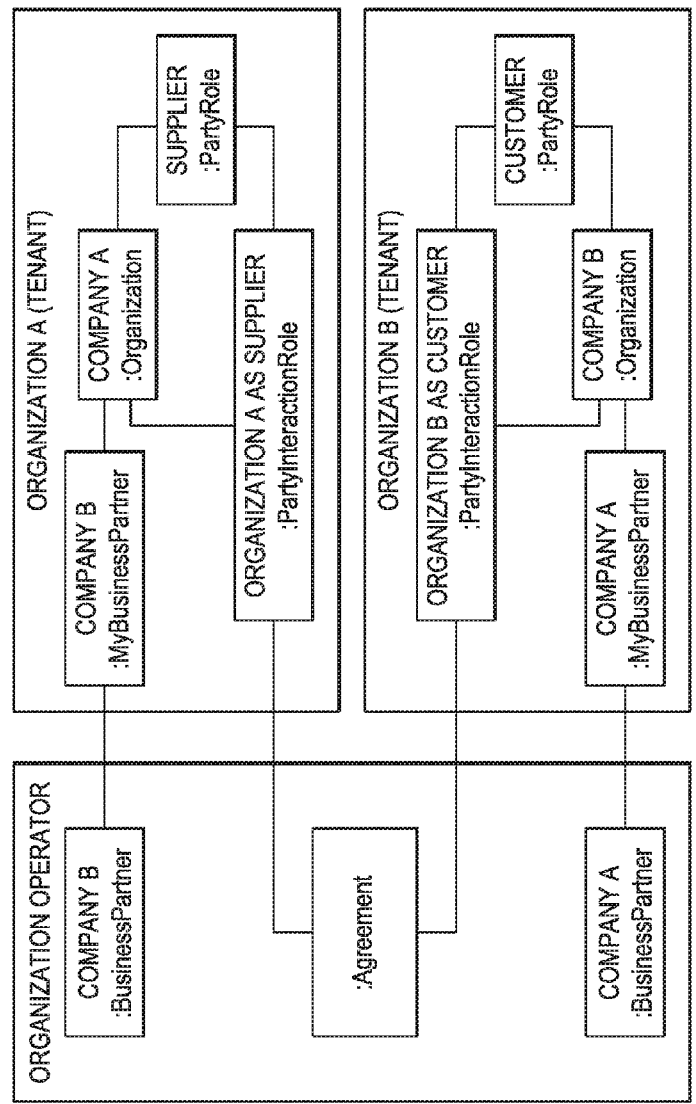
FIG. 8 depicts a diagrammatic representation of an example of tenant and operator interaction according to some embodiments.

Shown in FIG. 8 is an example of exemplary objects involved in a rules agreement and, in particular, one for purchasing from a supplier. In the example illustrated in FIG. 8, an organization Operator (e.g., the operator of multi-tenant supply chain provisioning system 100 of FIG. 1) functions as a notary and maintains a rules agreement. The organization operator may also maintain registration information, such as profiles of its tenants, that identifies organizations such as Organization A (customer) and Organization B (supplier), for example. Organization A may include objects identifying its role as a customer, its partner relationship with Operator, and its interaction role as a supplier. Similarly, Organization B may include objects identifying its role as a customer, its partner relationship with Operator, and its interaction role as a supplier.

Figure 9:
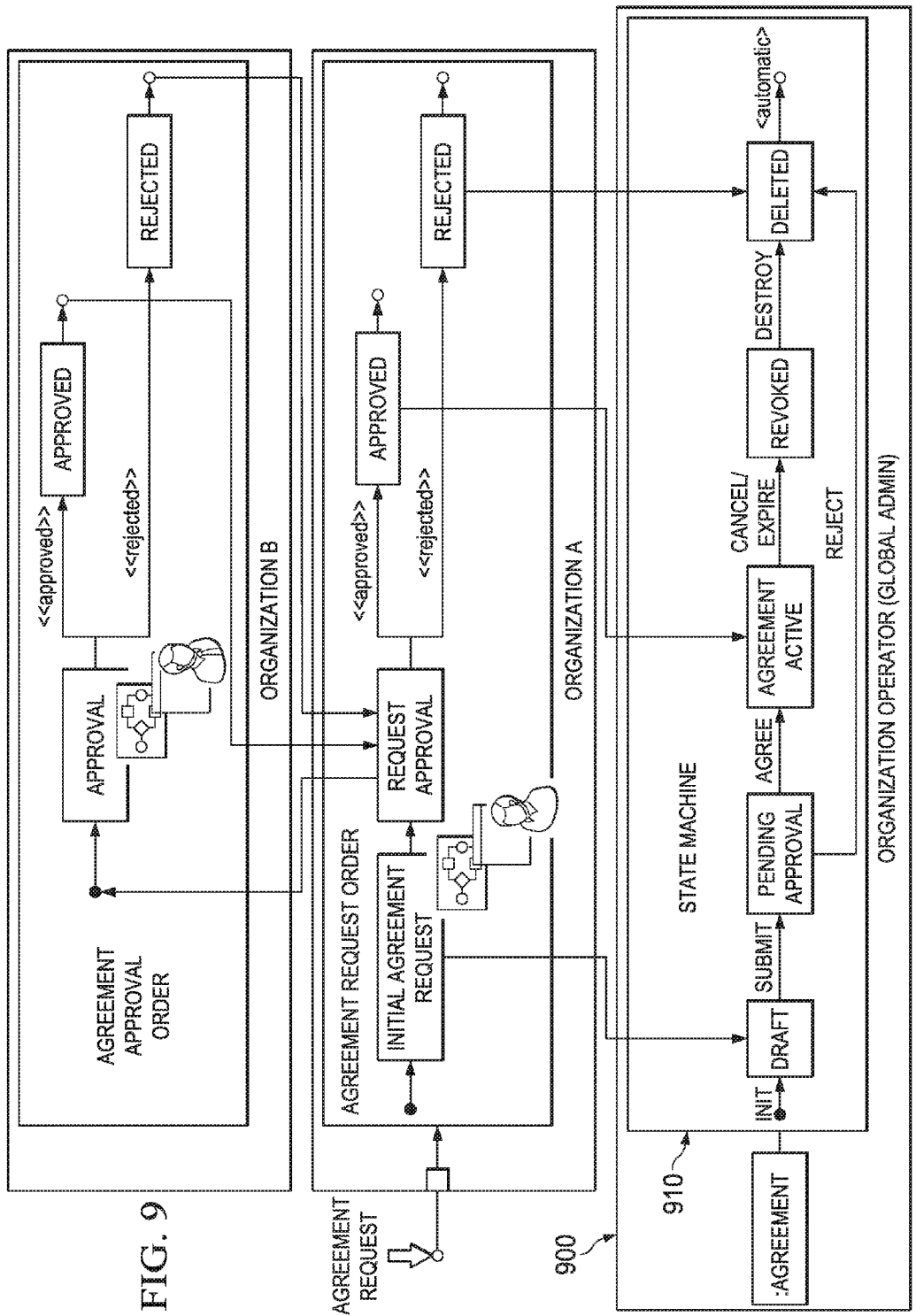
FIG. 9 depicts a diagrammatic representation of an example of a rules agreement approval procedure according to some embodiments.

As shown in FIG. 9, in operation, an agreement is created upon receiving an agreement request. The rules associated therewith become binding upon approval of the other party. It becomes final when both parties approve of the agreement via multi-tenant supply chain provisioning system 900 operated by Operator. As discussed above, this process is state controlled by statement machine 910. In some embodiments, a buyer (e.g., Organization A) may initiate a request for an item (e.g., a product or service) via a catalog user interface. This starts or otherwise triggers an approval process at a supplier of the item (e.g., Organization B) via multi-tenant supply chain provisioning system 900. An acceptance will then be communicated back to the buyer.

Figure 10:
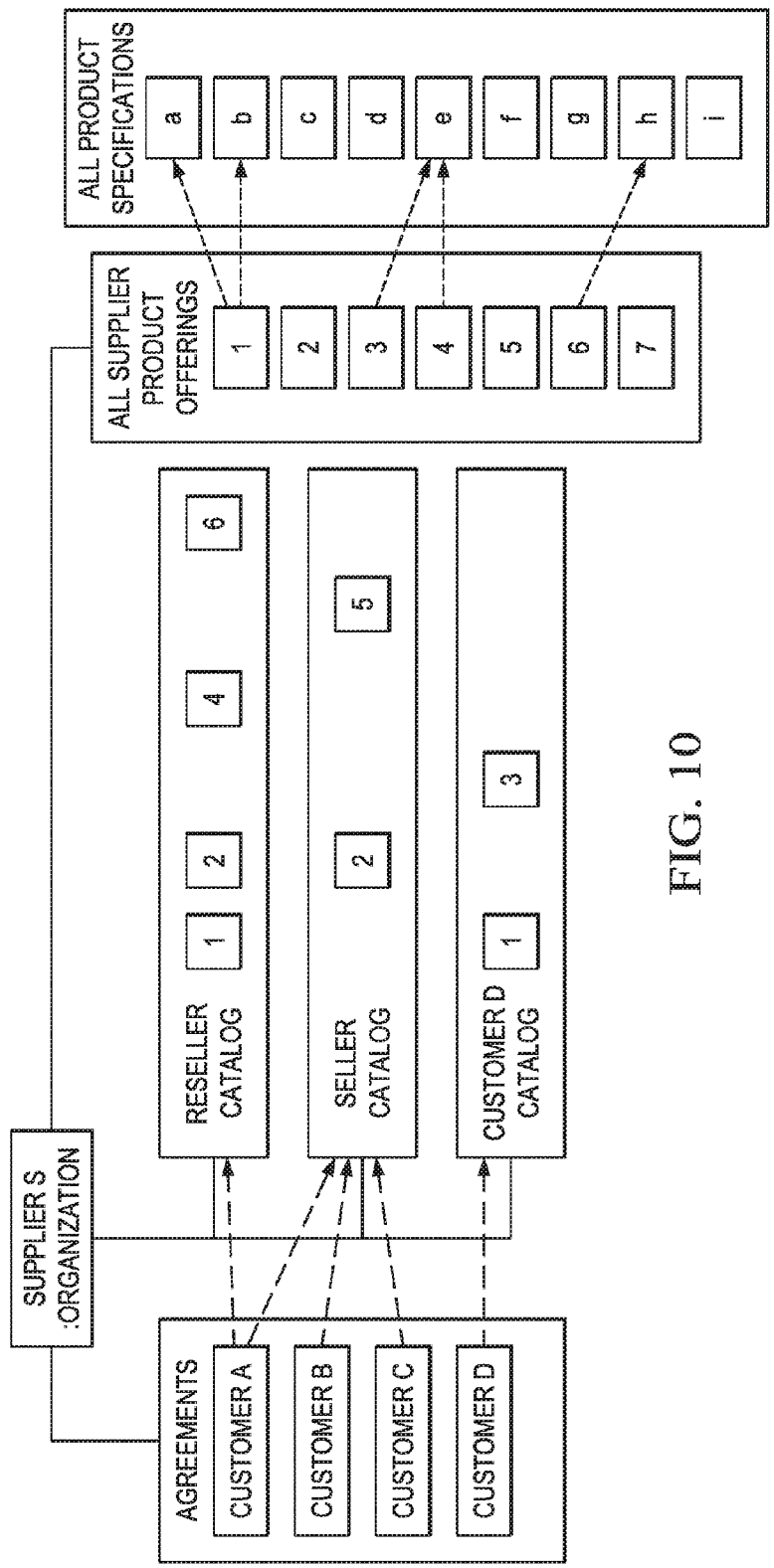
FIG. 10 depicts a diagrammatic representation of an example of relationships between product offerings, catalogs, and parties according to some embodiments.

As shown in FIG. 10, which product offerings a customer can buy depends on the electronic catalog(s) to which the rules in his agreement give him access. Using this mechanism of agreements and available catalogs has the technical effect of creating separate distribution channels, if needed. Multiple customers can have agreements that give access to one or multiple electronic catalogs on the multi-tenant supply chain provisioning system. In some embodiments, an electronic catalog is implemented as a set of product offerings and this set is the unit in which those product offerings are made available to customers. The navigation throughout a catalog may be based on the categorization of product offerings. A customer can also have its own private catalog on the multi-tenant supply chain provisioning system. Within an agreement, a company (which is a tenant of the multi-tenant supply chain provisioning system) can arrange variables like discounts, period in which the agreement is valid, whether the customer can be a reseller, whether the customer is allowed to repackage a product offering into a composite product offering, etc.

In some embodiments, it is possible to have multiple units (e.g., tenant organizations) per partner. In embodiments in which agreements are on the level of the business unit, this means that within a partner (company) there can be units (on different regions) that have a reseller/customer relationship.

Partners may have one or more tenant organizations. When a partner owns multiple organizations, those organizations may be represented as units on the multi-tenant platform. Because those units are mapped to tenant organizations on the multi-tenant platform, each unit is provided with a separate environment for managing users, products, agreements and catalogs. If one of the tenant organizations is also defined as the admin office of a channel and that channel owns those other organizations, then this channel admin office can also act as a partner admin office.

In some embodiments, a channel can create, modify, and delete organizations that belong to the same or to different partners (companies). The channel has an organization that acts as the admin office. Both channel and this admin office refer to the same business partner. The channel can view all data that is stored by the organizations that are managed by the channel.

A supplier creates sales/reseller agreements with other organizations. Those other organizations may belong to different partners. However, it is possible that some may belong to the same partner as the supplier. A supplier's organization is the admin office from where the agreements and the catalog are managed. Agreements could be defined on the level of the partner or on the level of the admin organization.

Figure 11:
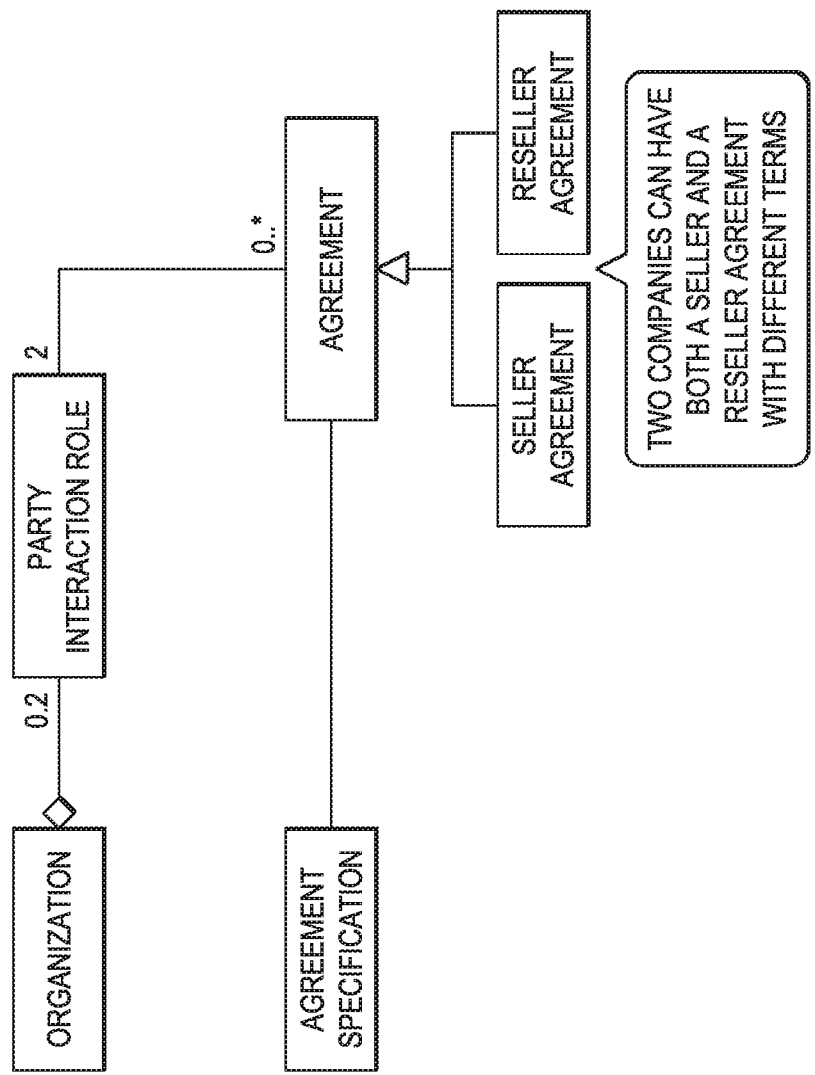
FIG. 11 depicts a diagrammatic representation of an example of rules agreement relationships according to some embodiments.

As shown in FIG. 11, it is possible that two companies have multiple agreements of differing types. A company can buy products for its own consumption and, when reselling products having different agreement terms, could apply per type of agreement.

As noted above, in some embodiments, a supplier may offer its products via an electronic catalog on the multi-tenant supply chain provisioning system that is visible to some or all of the supplier's customers. A product offering is how products are offered to customers. When submitting an order for this product offering, a new product is created. As illustrated in FIG. 10, a product offering refers to a product specification (that describes how a product is constructed) and includes documentation, images, video, etc. about the product—whatever is necessary to describe the product to the customer. There can be multiple product offerings for the same product specification, for example with different payment methods. As a specific example, one product offering can be an annual subscription to a product, while another product offering is a monthly subscription to the same product. Each product offering may have its own price. Product offerings can be composed of other product offerings, for example as a promotion action where multiple products are offered together for one price.

In some embodiments, product offerings may be implemented using the same composite pattern as products. A product offering can be combined with other product offerings into a new product offering. In some embodiments, because each product offering may have a valid period, the composite (a product offering that is composed of other product offerings) cannot have a valid period that starts earlier than or ends later than any of the product offerings it is composed of. Additionally, to ensure that a modification of a product offering will invalidate other product offerings depending on this product offering, all product offerings that are published on the multi-tenant supply chain provisioning system may become immutable. Another reason to do so is that product offerings could be reused by other companies (that are registered tenants of the multi-tenant supply chain provisioning system) that act as resellers.

As noted above with respect to FIG. 7, product offerings can be state controlled. When a product offering is created, it can be edited and modified until it is published (i.e., entering a "published" state). Before publishing, the product offering can be submitted and, if needed, an approval step can be implemented. After publishing, a product offering can be destroyed in two ways. It gets expired when the current date exceeds the specified valid period or when the product offering is explicitly deleted. In some cases, a composite product offering can combine existing (atomic or composite) product offerings into a new single offering.

A product offering that is purchased by a customer may contain the information on which the purchase was based. For example, the information may include the product offering characteristics, product offering price, and product specifications. In some embodiments, to modify a product offering or its prices, it is replaced by a new product offering and product offering price. In some embodiments, all the existing product offering orders remain linked to the original product offering and product offering price.

In some embodiments, a product offering may be defined in a specification and can be used by the multi-tenant supply chain provisioning system to define the characteristics of the product offerings. In this way, if a product offering can have an instruction video, the multi-tenant supply chain provisioning system may present characteristic(s) that defines the name and position of the video.

In some embodiments, when reselling a product, there may be ways to fulfill that order. For example, a product may be resold by transferring all the sellable content over to the reseller. In that case, the reseller also has the specification and after reselling the products, only a money transfer is applicable. In this case, the fulfillment of the order is done completely by the reseller. However, if the product is not transferred to the reseller, but only linked into its product offering, the fulfillment of the resold product offering may be transferred to the organization from which it was linked—the supplier. The supplier then performs this part of the order fulfillment.

Figure 12:
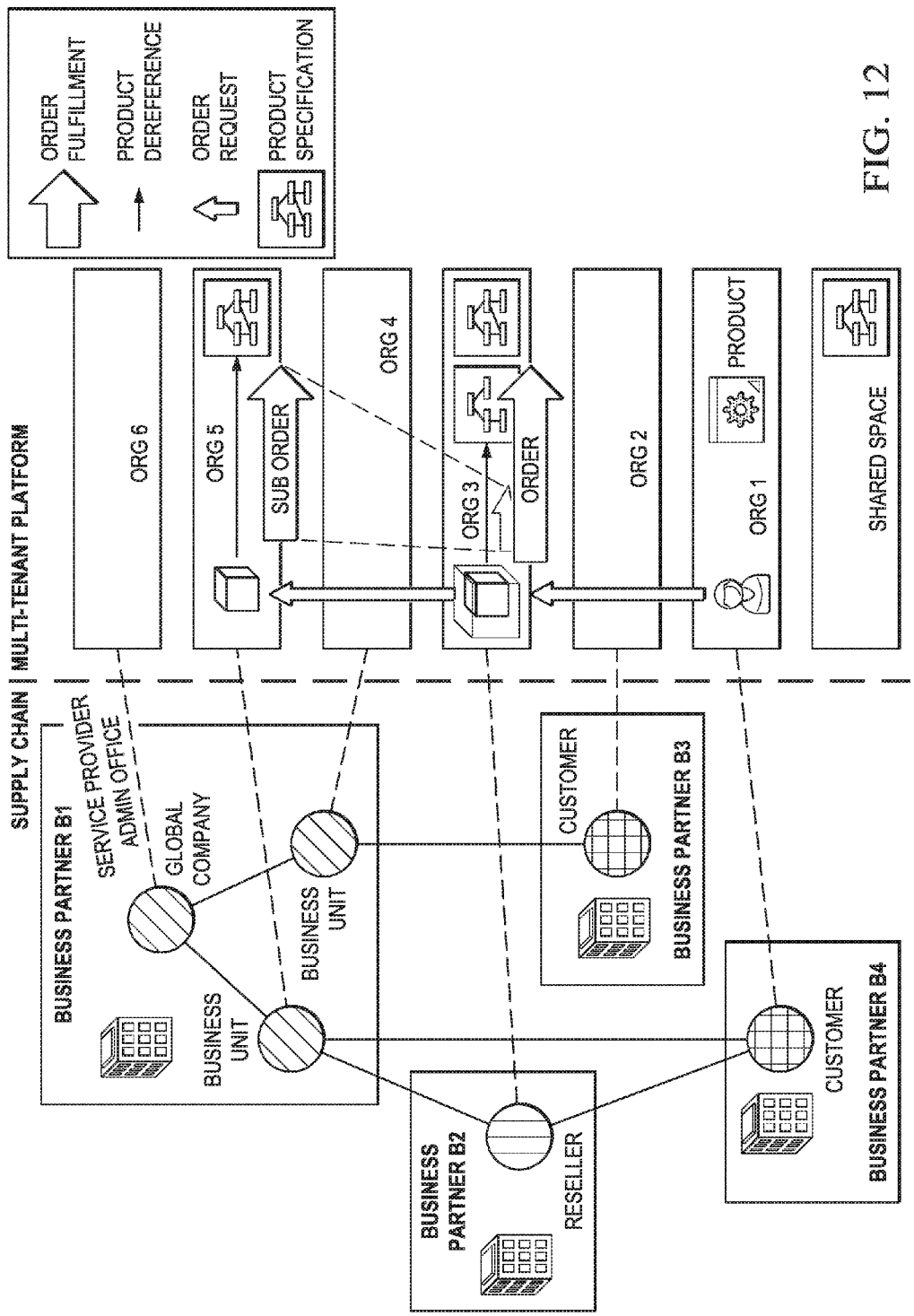
FIG. 12 depicts a diagrammatic representation of an example of multi-tenant platform and supply chain interaction according to some embodiments.

FIG. 12 shows by example how the fulfillment of product offerings can be handled via embodiments of a multi-tenant supply chain provisioning system operating on a multi-tenant platform. In the example illustrated, a customer B4 (which is a registered tenant of the multi-tenant supply chain provisioning system, identified as ORG 1) initiates a product offering order from a reseller B2 (which is also a registered tenant of the multi-tenant supply chain provisioning system, identified as ORG 3). This order runs in the context of the customer's organization and the ordered product (which, for example, can be a software product or service) must be delivered or made available in the context of the same organization. However, the fulfillment of the product instantiation has to be done where the product is defined (e.g., at a suppler organization).

In this example, the reseller receives (via the multi-tenant platform) a product offering order to be executed on behalf of the customer. The product offering is a composite and is composed of a product offering for a product defined by the reseller (ORG 3) and a product offering that is defined by the supplier (ORG 5, which, in this example, represents a business unit of a partner B3) and resold by the reseller (ORG 3). Thus, the multi-tenant supply chain provisioning system decomposes the product offering order received by the reseller, instantiates a new product offering order for the product offering defined by the supplier (a sub order), and communicates the sub order to the supplier (ORG 5).

The supplier (ORG 5) receives a product offering order to be executed on behalf of the original customer but the submitter of the product offering order is the reseller. A local product order is started by the supplier to create the product offering defined by the supplier according to the product specification contained in or associated with the product offering. The reseller creates its product offering identified in the product offering order from the customer according to the product specification contained in or associated with the product offering defined by the reseller. The final product, an instantiated software product, includes the product offerings from the supplier and the reseller and is made available to the customer's organization through a product subscription, at which time the order is fulfilled.

As illustrated in this example, for every action on this product, the reseller and the supplier are involved for carrying out the order. Various components of the multi-tenant supply chain provisioning system, including the engine module and the product offering order service described above, work in concert to take deterministic actions, particularly with respect to data sharing and access control to the shared data by different tenants, that facilitate this process and ensure that the order is fulfilled. The mechanism in which orders are distributed across a supply chain can be based on the particular product offering order. In some embodiments, products can be created in the organization of the supplier. The supplier maintains the products and services consumed by the customer. In case of a reseller that is also a supplier, the products of the reseller can be created in its own organization and what is resold in the organization of the supplier. The customer can get a subscription on the created products and the subscription contains information on who "owns" those products.

Figure 13:
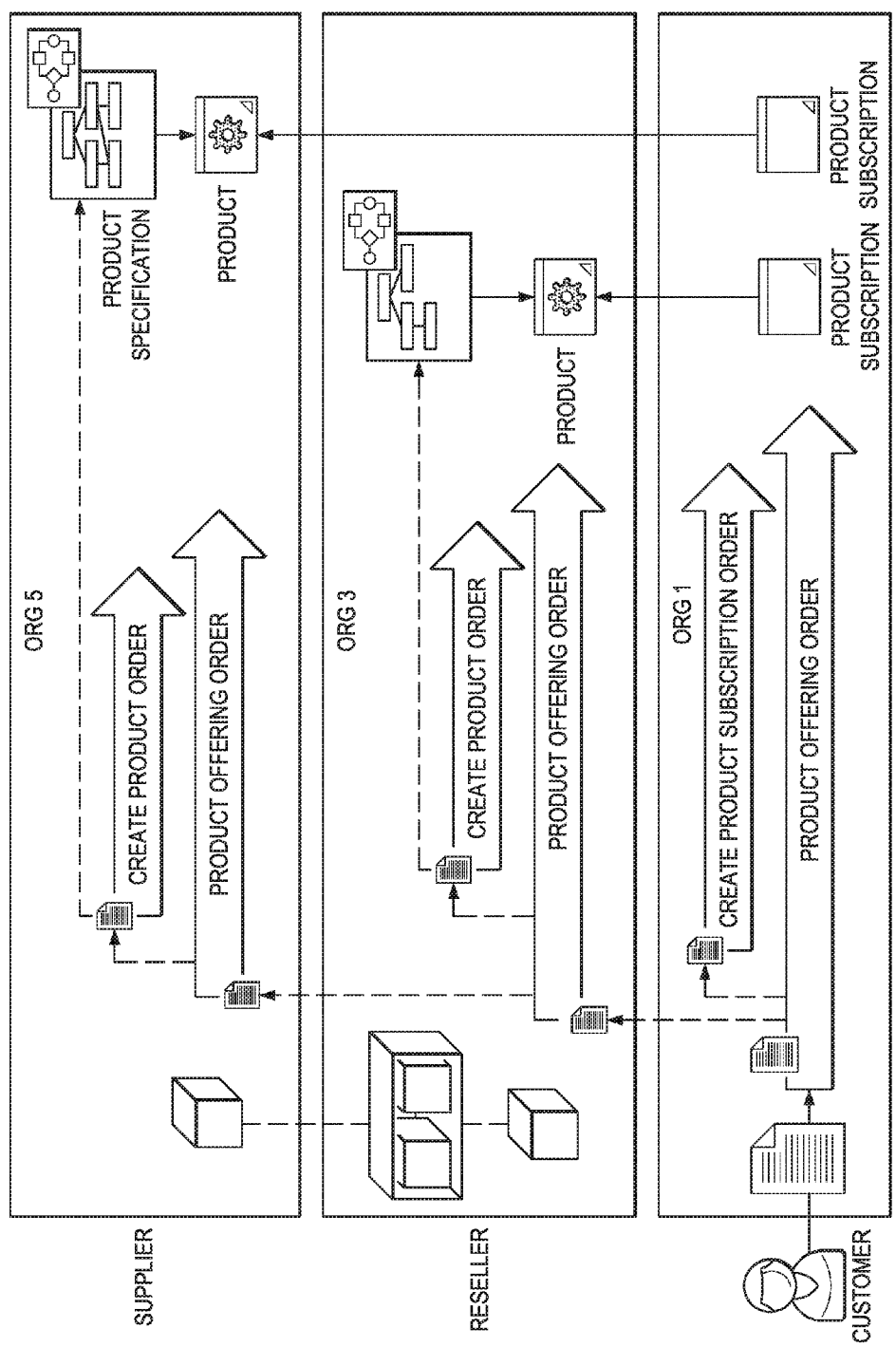
FIG. 13 depicts a diagrammatic representation of a product order procedure according to some embodiments.

FIG. 13 shows by example how a purchased product offering can be processed by resellers and suppliers.

The previously described process of fulfilling a purchased product offering can be configured for modification as well as deletion of a purchased product offering. However, in that case, it is not about the product offering but the purchased product offering itself, for instance, modifying the products that are part of the product subscriptions.

To modify a purchased product offering, a customer can submit an order that contains the subscription ID and the new characteristic values. The subscription ID identifies which product is meant and the characteristic values contain the changes. Suppose the customer wants to have modifications for the product that the customer is subscribed to. They may issue a modify product subscription order that holds information about which product needs modification and the characteristic values that need to be updated. The information about the product subscription is retrieved from the system. This information specifies that the product is hosted by the supplier but is acquired via the reseller.

Since the product was originally ordered from the reseller, the request is forwarded to the reseller. If the reseller approves (which, in some embodiments, is a configurable process step), the request is communicated to the supplier.

In some embodiments, the supplier could also have approval steps. However, if everything is checked and approved, a product modification order is started in the organization of the supplier to modify the product using the product specification. During the whole process, the customer's modify product subscription order is updated to reflect the status of the process.

Figure 14:
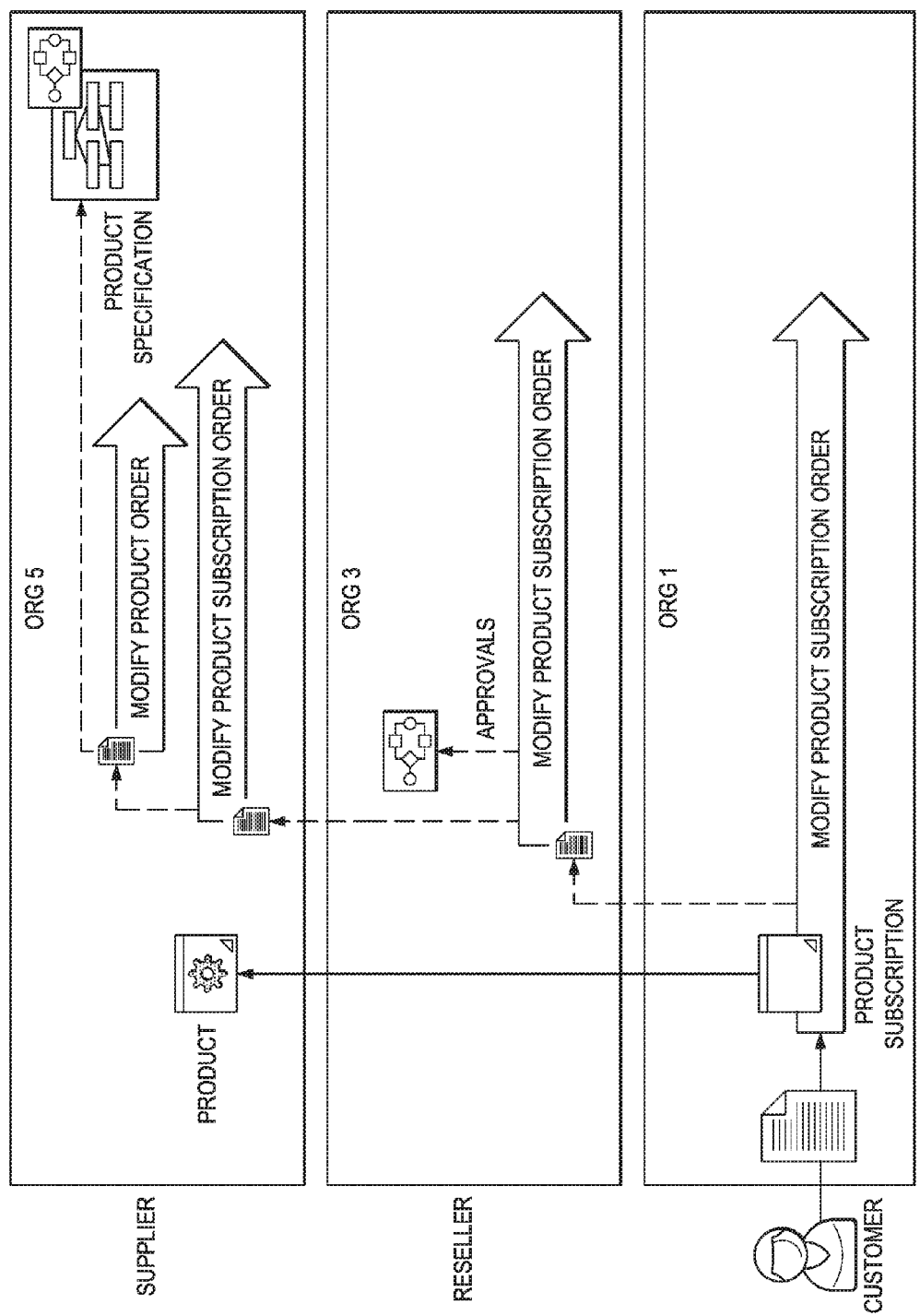
FIG. 14 depicts a diagrammatic representation of a product order modification procedure according to some embodiments.

FIG. 14 shows by example how a modification of a purchased product offering can be handled by the reseller and supplier. In this example, deleting a purchased product offering may follow the same lines as the modify process described above.

For example, suppose the customer wants to delete its product subscription. They may issues a delete product subscription order. The information about the product subscription is retrieved from the system. This information specifies that the product is hosted by the supplier but is acquired via the reseller.

Since the product was originally ordered from the reseller so the request is forwarded to the reseller. If the reseller approves, the request is directed to the supplier.

The supplier could also have approval steps. However, if everything is checked and approved, a product deletion order is started in the organization of the supplier to delete the product. It is possible that the supplier may want to keep the product and that only the subscription is removed. However, in general, especially if the product is software, it will be destroyed together with possibly sensitive user data. In some embodiments, the subscription is removed from the organization of the customer.

Figure 15:
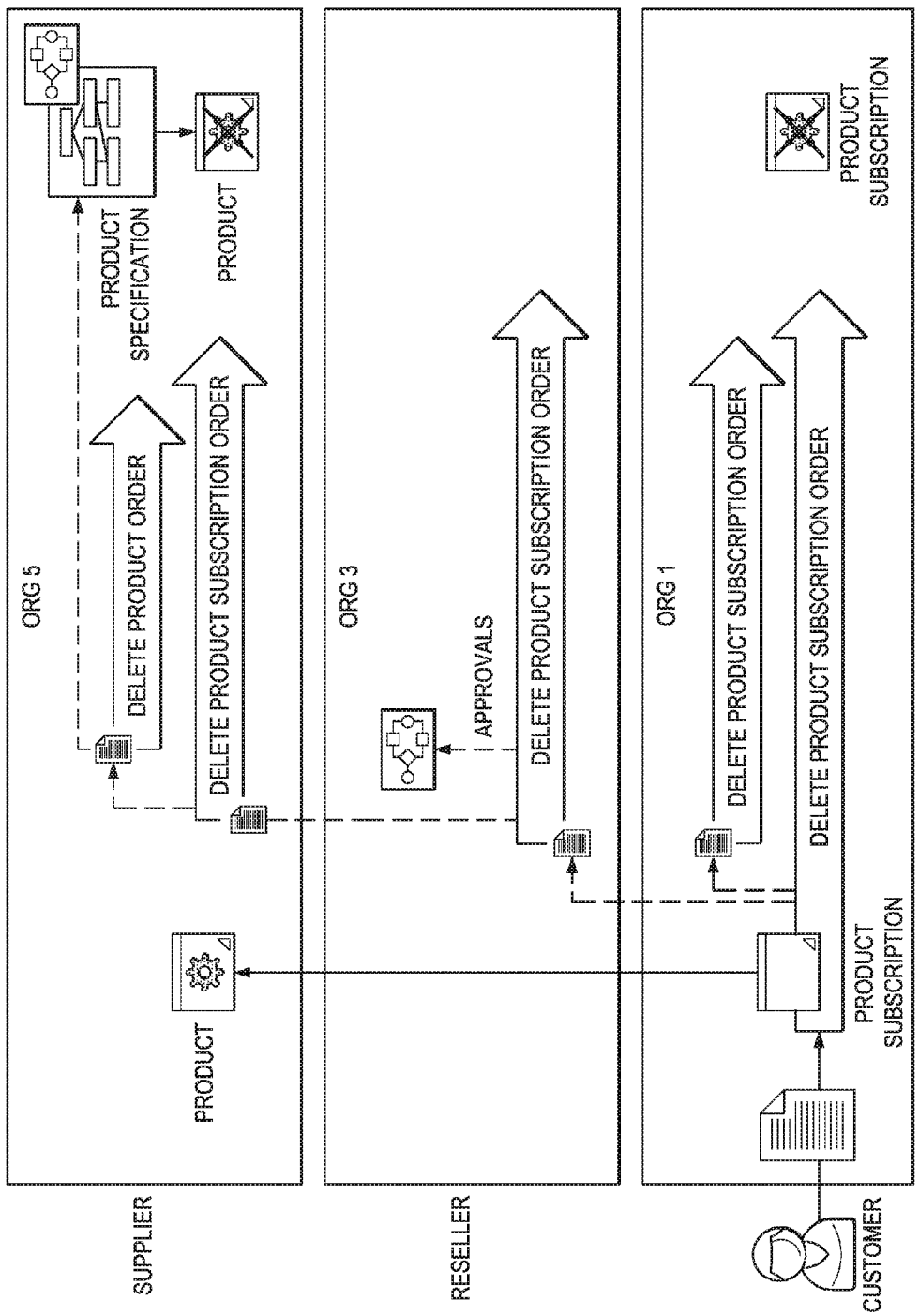
FIG. 15 depicts a diagrammatic representation of a product order cancellation procedure according to some embodiments.

An example process of deleting a purchased product offering is shown in FIG. 15.

Figure 16:
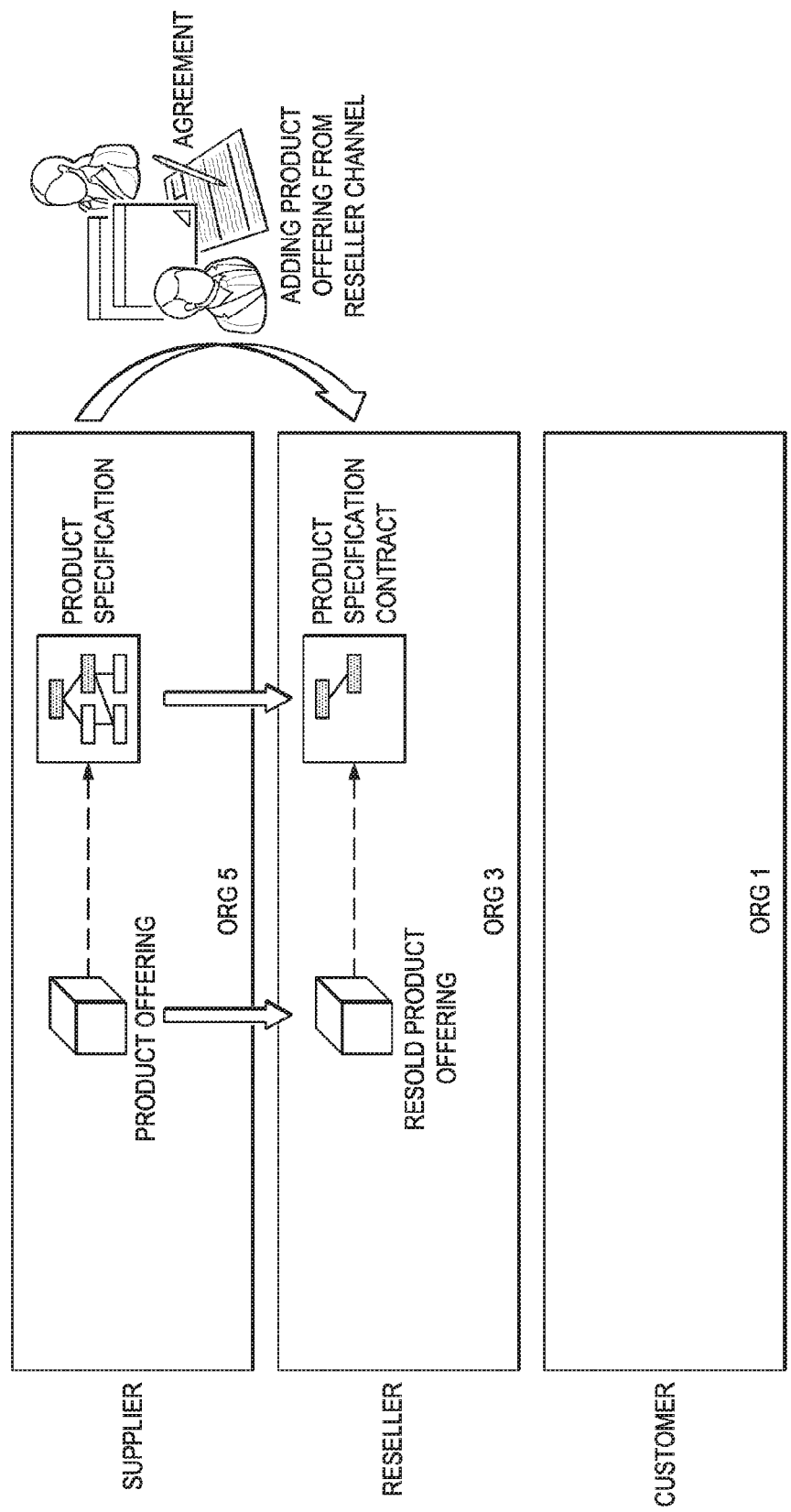
FIG. 16 depicts a diagrammatic representation of an example of system operation according to some embodiments.

When showing product offerings, the product specification may be needed for some of the functional details, such as the product characteristics. However, what if the product offering is reusing a product specification of another organization? To address this issue, as part of reselling a product offering of another organization, the original product specification is processed to derive a product specification contract that is used by the reselling company to connect to the product offering to be able to show the relevant product specification information. This is shown in FIG. 16. Note in this case, the product specification contract does not contain any organization-specific information that is hidden for the other organization. Rather, specific information about the other party in an agreement can be stored within each organization and is private to that organization.

At this point, it might be helpful to point out two important aspects about the need to updating product offerings:

They can be resold by other companies. A product offering change or price change could violate the agreements between companies.

They have to be immutable for traceability back to the product offering on the moment of sales.

To this end, updating a product offering can be a provisioning process containing (configurable) approval processes of all involved parties and, if agreed, the replacement of the product offering by the replacing product offerings. If a reseller has bundled this product offering in a composite product bundle, this composite product bundle may also be replaced. The update process will take care of this automatically after the approval steps have been completed.

Figure 17:
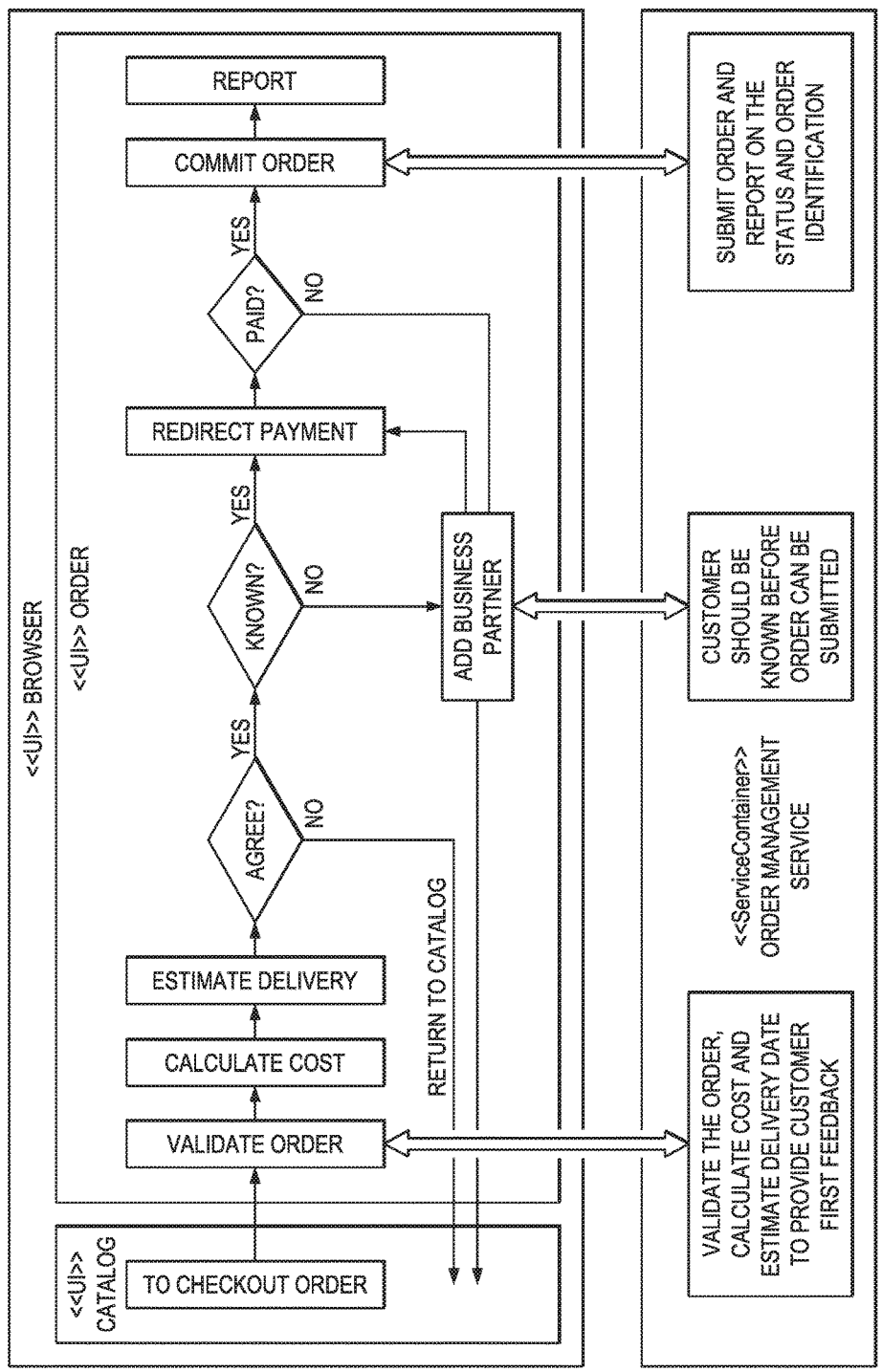
FIG. 17 depicts a diagrammatic representation of an example of system operation according to some embodiments.

When the user has filled his catalog "basket" (a container of certain information from the catalog) with the product offerings he/she wants, the next step is to step into order management by doing a checkout of the basket. In some embodiments, these steps are performed by a backend process flow. In some embodiments, for each call of those calls, it may be necessary that the call can be redirected to another system. For example, calculating the cost, estimating delivery and payment are not process steps that will be handled in some versions of the catalog. If all validation on the backend turns out right, the final step is the commit of the order. This will trigger the backend process flow to close off the prepare stage of the order and enter the preprocess stage. This process is shown in FIG. 17.

As noted above, a multi-tenant supply chain provisioning system in accordance with embodiments employs a process referred to as a purchased product offering.

In some embodiments, each product offering order can have the following steps/stages.

Figure 18:
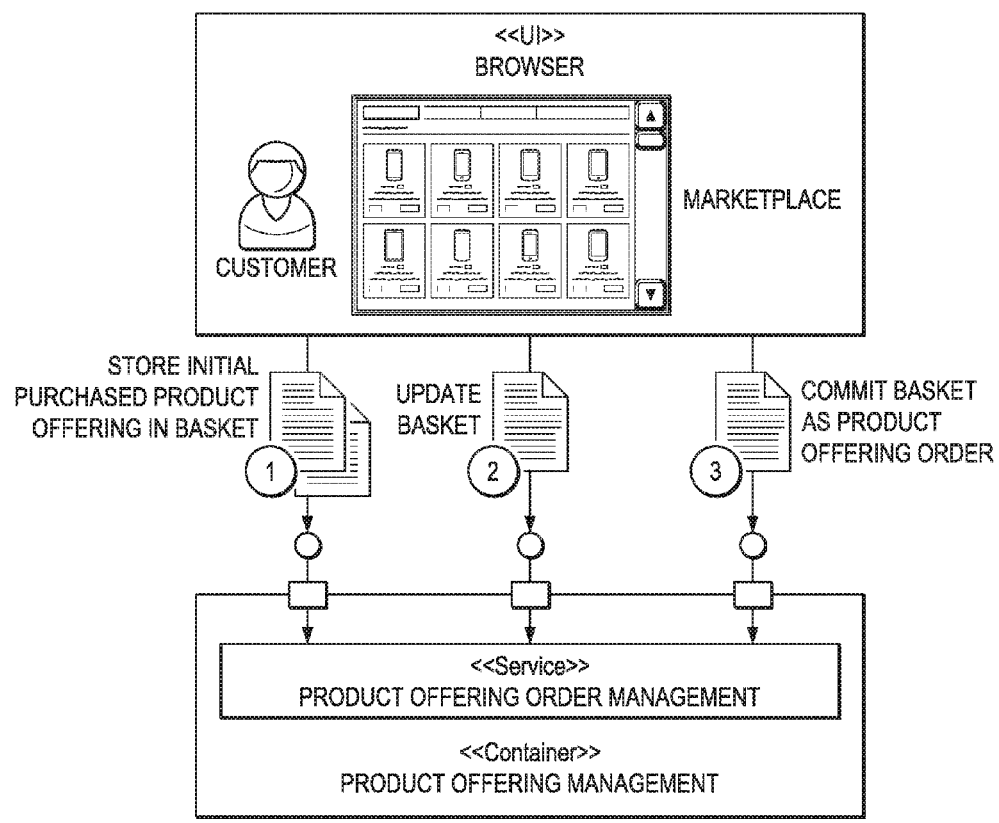
FIG. 18 depicts a diagrammatic representation of an example product ordering according to some embodiments.

Prepare Stage
a. Preparing the order
b. Committing the order
c. Cancelling the order
Pre-Processing the Order
a. Validating the order (programmatic)
b. Approval of the order (manual steps)
Processing the Order Lines
a. Delegate purchased product offerings to the product offering owning organization
b. If product owning organization create product order
c. Wait until the delegated purchased product offering is ready or until the product order is ready
Post Processing the Order As shown in FIG. 18, the product offering order that results in a purchased product offering can be constructed in steps. Using a user interface ("UI"), a customer can build up an order and store intermediate results in his/her basket. This basket can be updated by adding or removing order lines (each order line is one to-be-purchased product offering). Updating a to-be-purchased product offering may result in replacing the content from another line with the new content (as such, characteristic values are not individually updated but the whole product offering order line is replaced). If the customer is ready, the basket is committed. It is also possible to directly inserting a product offering order and committing it in one call.

In some embodiments, there can be multiple instances of the same product offering inside a composite product offering. For example, one could order two phones of a certain brand, a white one and a black one. As part of the order, this information about the color may be provided by the customer and the order may contain two instances (purchased product offerings) of the same product offerings.

Figure 19:
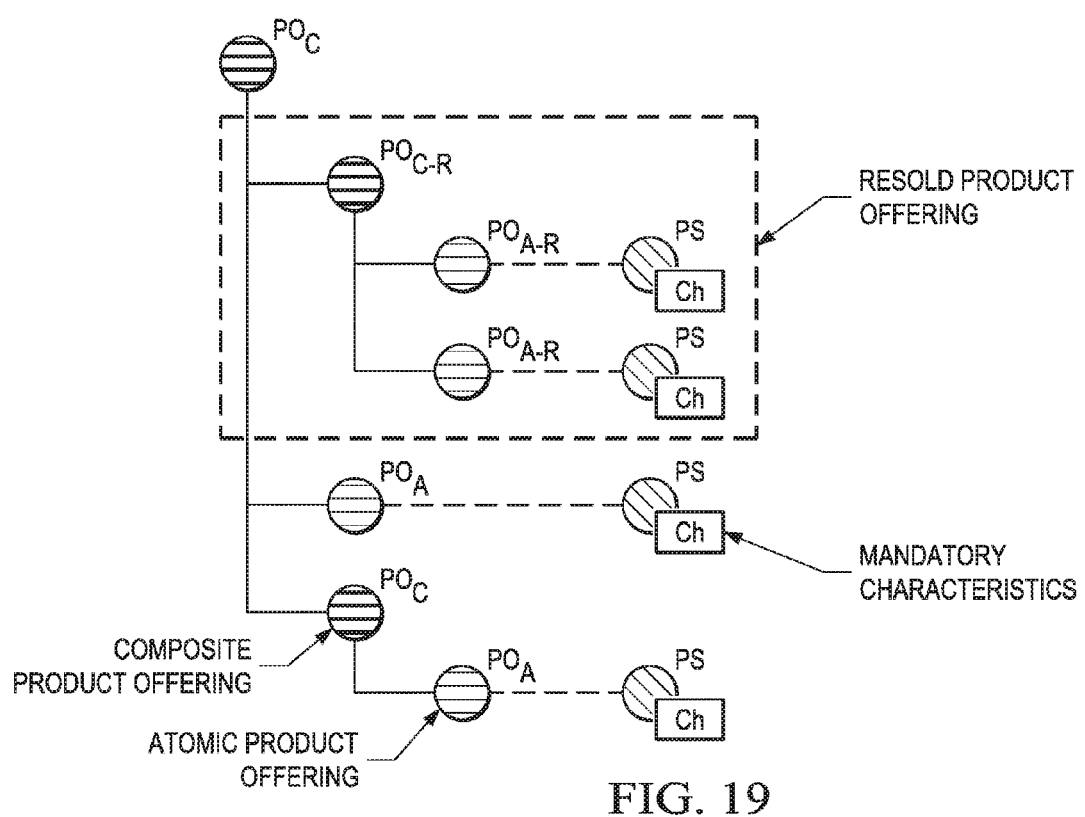
FIG. 19 depicts a diagrammatic representation of an example of product offerings according to some embodiments.

In some embodiments, a product offering can be composite or atomic. The atomic product offering holds the fully qualified name (FQN) of a product specification. The composite product offering is a container that contains other composite or atomic product offerings and may have no relation to a product specification. However, a composite product offering is used to resell a product offering of another supplier. As shown in FIG. 19, product offerings (PO) may be annotated with $PO_C$ for composite, $PO_A$ for atomic product offerings and $PO_{C-R}$ and $PO_{A-R}$ if the product offering is resold. The structure depicted in FIG. 19 is used as an example in this discussion.

In some embodiments, a product offering order may only need the ID of the product offering being purchased. This will even work for composite product offerings (also known as a product offering bundle), as long as there is no additional information needed for the product specifications. However, if the product specification contains characteristics that can be filled in (either optional or mandatory fields), this information is to be passed as part of a web services call (e.g., a Simple Object Access Protocol or SOAP call).

Figure 20:
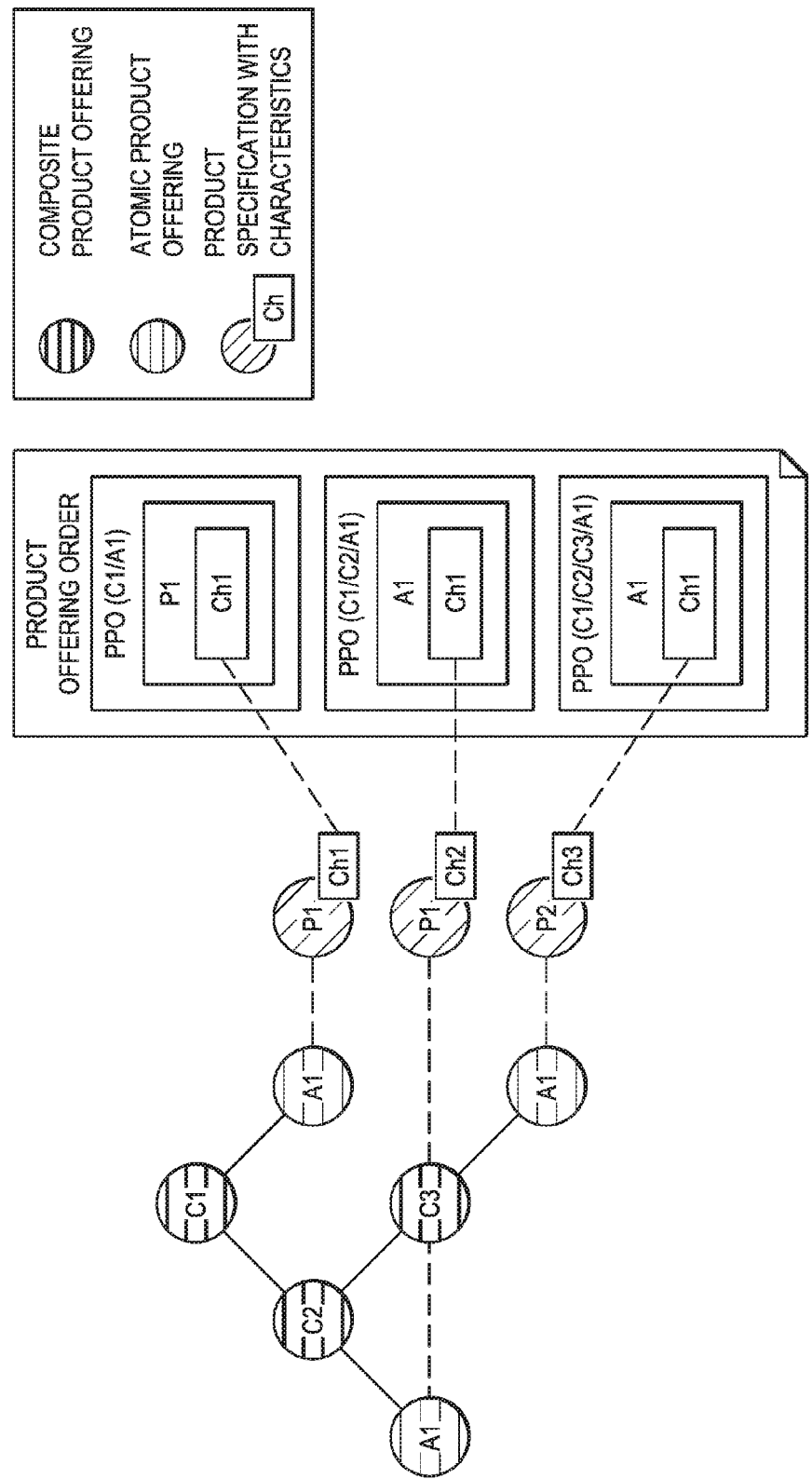
FIG. 20 depicts a diagrammatic representation of an example of product offering relationships according to some embodiments.

It is possible that a given product offering is multiple times inside the same composite product offering, but is purchased with different characteristic values for the product specifications. The order document should contain sufficient information to identify which set of information belongs to which product offering instance. As an example, FIG. 20 shows product offering A1 being twice part of the product offering bundle C1. Inside the product offering order document, for each product specification that requires input, a purchased product offering (PPO) element is created that contains the inputs for each characteristic as well as the path of the product offering inside of the bundle.

When the product offering order enters the backend service, the first action is to construct the purchased product offering order structure. In some embodiments, the only thing needed for that is the product offering ID. The purchased product offering structure may follow the same structure as the product offerings. In some embodiments, the order may be created in the context of the customer's organization and approval may be needed before the order is submitted to the supplier.

Figure 21:
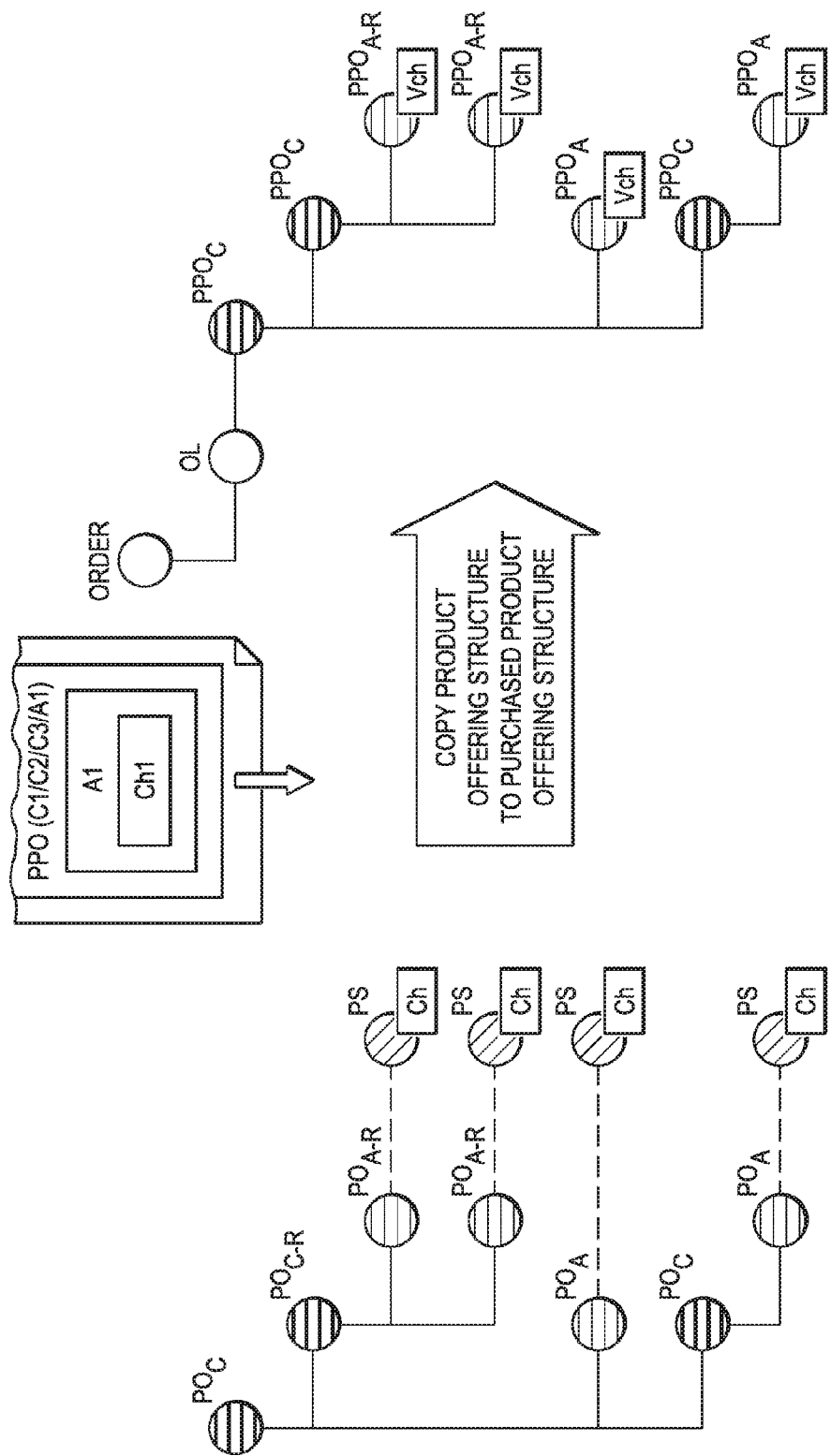
FIG. 21 depicts a diagrammatic representation of an example of product offering relationships according to some embodiments.
Figure 22:
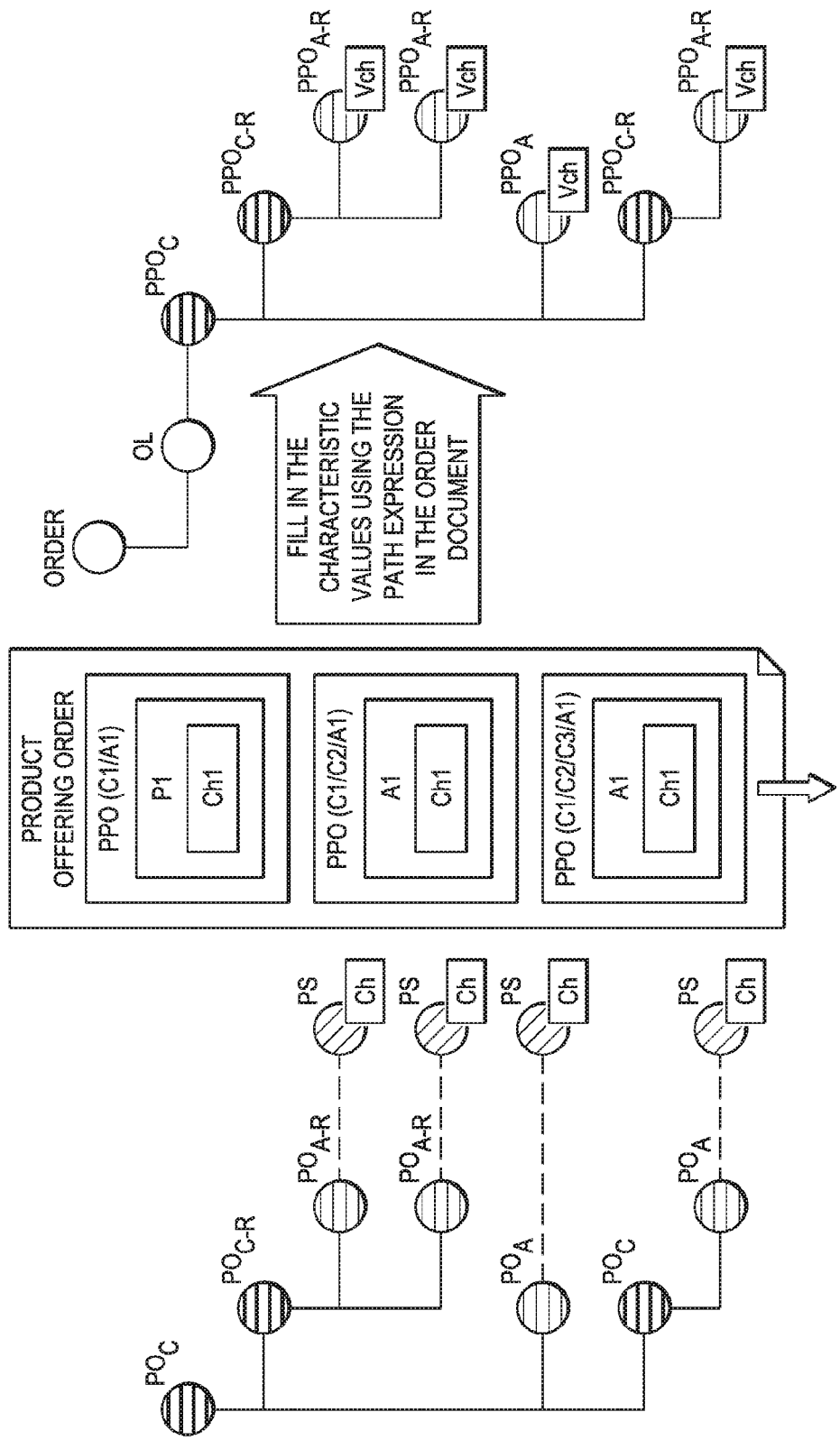
FIG. 22 depicts a diagrammatic representation of an example of product offering relationships according to some embodiments.

After creating the purchased product offering structure (see, for example, FIG. 21), the information in the order is used to fill in the characteristic values inside the purchased product offering (see, e.g., FIG. 22). The order document may contain the paths of sets of characteristics that the user has provided and that must be used to create the products.

Each of the atomic purchased product offerings may contain the characteristics needed to instantiate the related products. At this point, however, the product themselves cannot be instantiated yet because the product specification is most likely not yet accessible from the customers organization.

Internally, the values that are part of the product offering order are stored as children (ch1, ch2, etc.) of the atomic purchased product offering objects. Based on the soft linked FQN from the atomic product offering to the product specification, the atomic purchased product offering will be linked to the product specification and the entity value to the entity specification characteristics of the product specification. In some embodiments, the soft link can be replaced by the concrete version, by referencing via a globally unique identifier or GUID.

Figure 23:
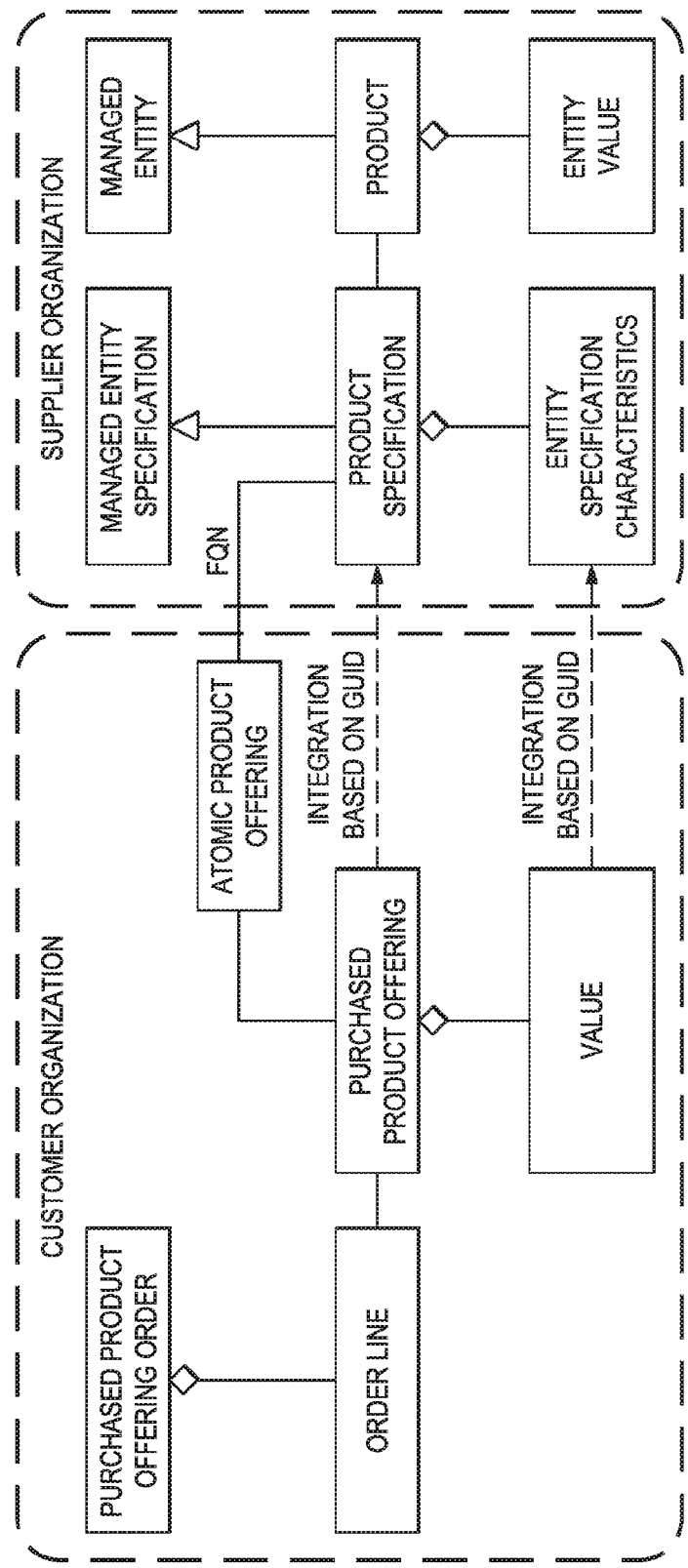
FIG. 23 depicts a diagrammatic representation of example customer and supplier interactions according to some embodiments.
Figure 24:
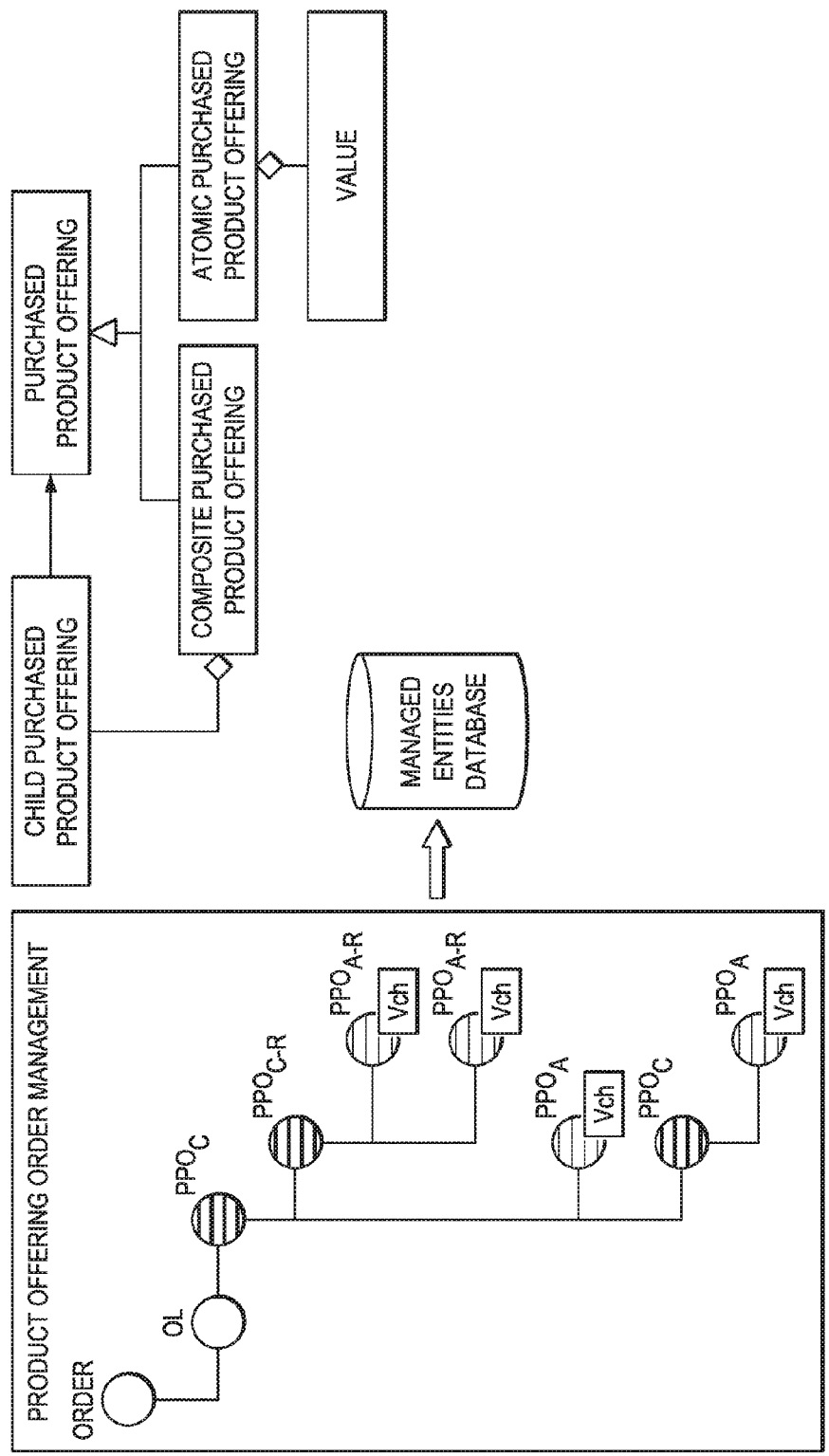
FIG. 24 depicts a diagrammatic representation of an example of product order management according to some embodiments.

In some embodiments, purchased product offerings and referenced product specifications can be stored in different organizations (see, for instance, FIG. 23). In such cases, there is technically a link. However, when submitting a query from inside the organization of the customer, it may not be possible to dereference the link from the purchased product offering value to the referenced product specification characteristic. To address this issue, the purchased product offerings structure may be created with the same structure as the product offerings (no elements are skipped) and stored as managed entities in a database, as shown in FIG. 24. In composite purchased product offerings, placeholders may be needed to properly position atomic purchased product offerings. This has the technical effect that prevents orders and positions from becoming ambiguous.

As described above, until a purchased product offering is committed, it is possible to add, delete or modify order lines of the order. In some embodiments, modifying an order line may be defined as replacing the purchased product offering by a new one that is in a "change purchased product offering order" document. When the order is committed, the process leaves the prepare phase and enters the preprocess stage.

A non-limiting example of pseudo code for storing a purchased product offering is shown below:

```
// Starting point for handling the order.
void createPurchasedProductOfferingOrder(ProductOfferingOrderDoc productOfferingOrderDoc)
{
OrderBo orderBo = CreateProductOfferingOrder(productOfferingOrderDoc);
for (OrderLineDoc orderLineDoc : productOfferingOrderDoc)
{
OrderLine orderLineBo = OrderLineBoFactory.create(orderLineDoc);
ProductOfferingBo productOfferingBo = productOfferingRepository.getExpandedProductOffering(orderLineDoc.getPOID( ));
purchasedProductOfferingBo = PurchasedProductOfferingFactory.create(productOfferingBo);
orderLineBo.setStateFullObject(purchasedProductOfferingBo);
iterateProductOfferings(purchasedProductOfferingBo,productOfferingBo);
iterateProducts(orderBo, purchasedProductOfferingBo,orderLineDoc)
}
// Recursively store all results in the database.
orderRepository.insert(orderBo);
}
// Build a tree of purchased product offerings that have the same
// structure as the POs. Match child by child.
// Order lines are not created for each purchased product
// offering. There is no need to introduce technical order lines
// yet.
void iterateProductOfferings(PurchasedProductOfferingBo purchasedProductOfferingBo,
ProductOfferingBo productOfferingBo))
{
for ( ProductOfferingBo childProductOfferingBo : productOfferingBo.getChildren( )
{
PurchasedProductOfferingBo childPurchasedProductOfferingBo = PurchasedProductOfferingFactory.create(childProductOfferingBo);
purchasedProductOfferingBo.addChild(purchasedProductOfferingBo);
if ( childProductOfferingBo.isComposite( ) )
{
IterateProductOfferings(childPurchasedProductOfferingBo,childProductOfferingBo);
}
}
}
// Map product characteristics to the right PPOs.
void iterateProducts(OrderBo orderBo, PurchasedProductOfferingBo purchasedProductOfferingBo, OrderLineDoc orderLineDoc)
{
for ( ProductDoc productDoc : orderLineDoc.getProducts( ) )
{
String[ ] paths = productDoc.getPaths( )
PurchasedProductOfferingBo foundPurchasedProductOfferingBo = purchasedProductOfferingBo.getPPObyPath(paths)
if ( foundPurchasedProductOfferingBo != null )
{
foundPurchasedProductOfferingBo.addCharacteristics(productDoc);
} else {
// Store the order and mark it as in error because there is a
// mismatch with the product section in the order doc.
orderBo.setInError( );
}
}
}
```

Figure 25:
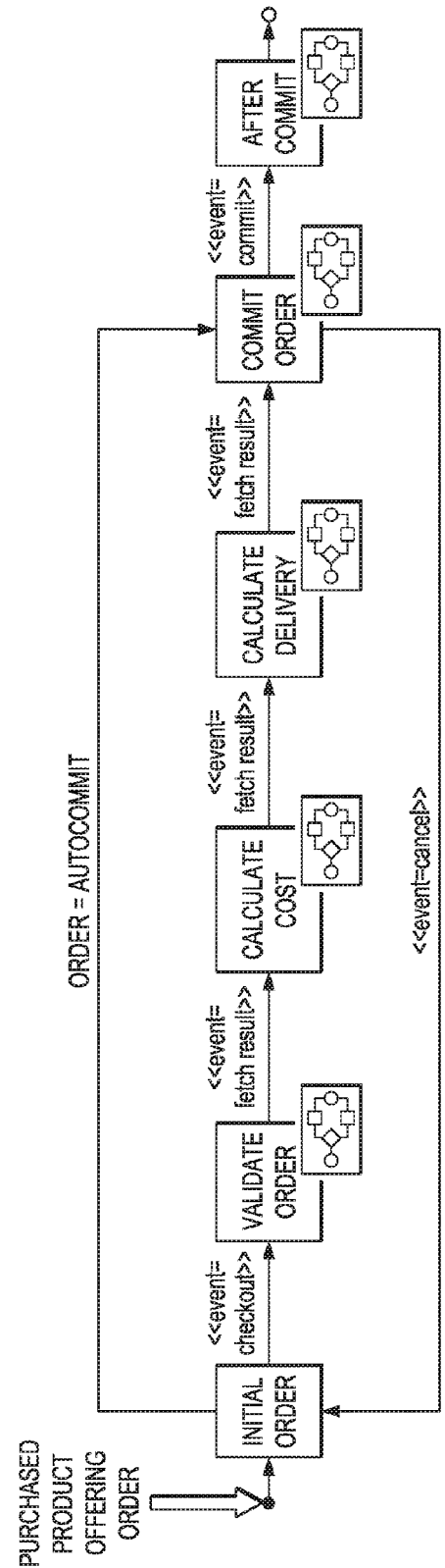
FIG. 25 depicts a diagrammatic representation of a product order procedure according to some embodiments.

The prepare stage provides the functionality to integrate with external systems to calculate delivery dates or cost, depending if the extension points are filled. When the initial order is stored there are two possibilities. The order is auto-committing, causing a transition to the end of the provisioning model. Alternatively, the order may follow the provisioning model when the user does a checkout of the "basket" (see, e.g., FIG. 25).

After checkout, one or more business process management systems (BPMs) can be triggered to perform certain functionality. In some embodiments, after a BPM returns, the provisioning model may wait until the user interface fetches the result (this may not depend on any action of the user). A successful fetch may result in a transition to the next stage. At the end of the provisioning model, the user has the possibility to commit or cancel the order.

When an order is initially submitted, it becomes functionally a kind of basket. It is not guaranteed that the customer will commit, so it will have an expiring date. Such an expiration date can be the order modification date plus a configurable expiration period. As long as the customer modifies the order, the order stays valid. However, if nothing happens, the order is cancelled after the expiration date is reached. It can be useful to keep the order in the database for analysis (e.g., "which products were considered by the customer but not purchased?").

The purchased product offering order in the preprocess stage can be, in some embodiments, the same as for product orders. It is possible to hook validation BPMs to check if the order is not in agreement with certain regulations. This BPM could interact with external customer systems, for instance, approval of the purchased product offering, if needed. Manual approval steps can also be added.

The purchased product offering order in the process stage will now be described.

Figure 26:
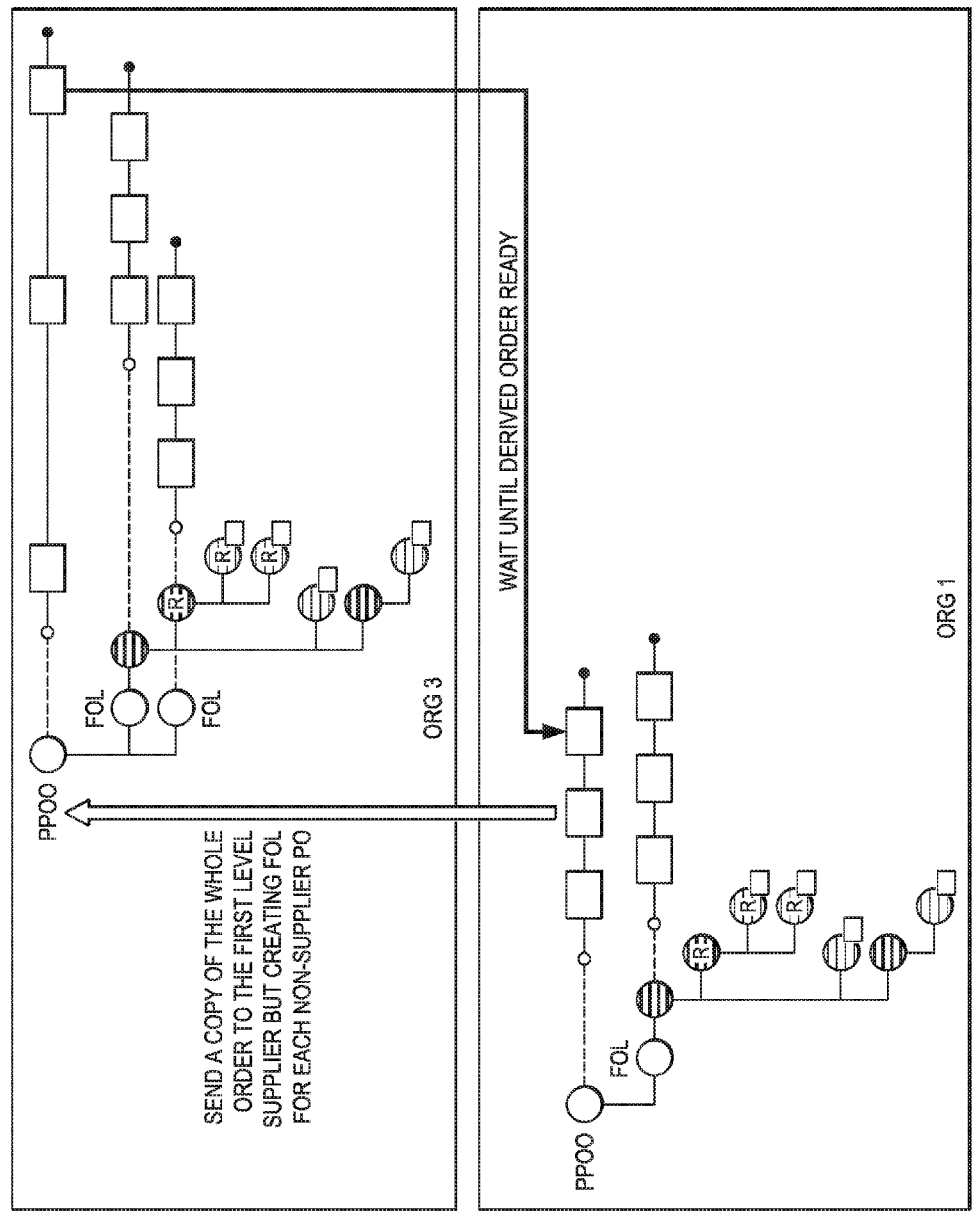
FIG. 26 depicts a diagrammatic representation of an example of product offering relationships according to some embodiments.

The initial order will as a whole be delegated to the supplier of the purchased product offerings. Delegation in this context refers to creating a new purchased product offering order in the organization of the supplier. When creating the order, new order lines may be inserted to attach to composite purchased product offerings that belong to the second level suppliers. The order in the customer organization may wait in the processing stage until the order of the supplier is completely finished, including its notification stage (see, e.g., FIG. 26).

In some embodiments, the recreated order for the first level supplier may have two separate parts, namely:
purchased product offerings of which the supplier is the owner
purchased product offerings of which another second level supplier is the owner For the own product offering, a product order can be created for each of the (atomic) purchased product offerings that points to a product specification of the supplier itself. An order line for a product can be created in the order to fulfill this product. The characteristics of the purchased product offering may be assigned to the product.

For the purchased product offerings that belong to the second level suppliers, a new purchased product offering is created for each of the second level suppliers and the functional order lines including the purchased product offerings are copied over to this order.

The supplier's purchased product offering waits in the processing stage until its own product order fulfillment is ready and all the second level supplier purchased product offering orders are also ready. In some embodiments, the same pattern can be repeated for the second level suppliers to the third and higher level suppliers.

Figure 27:
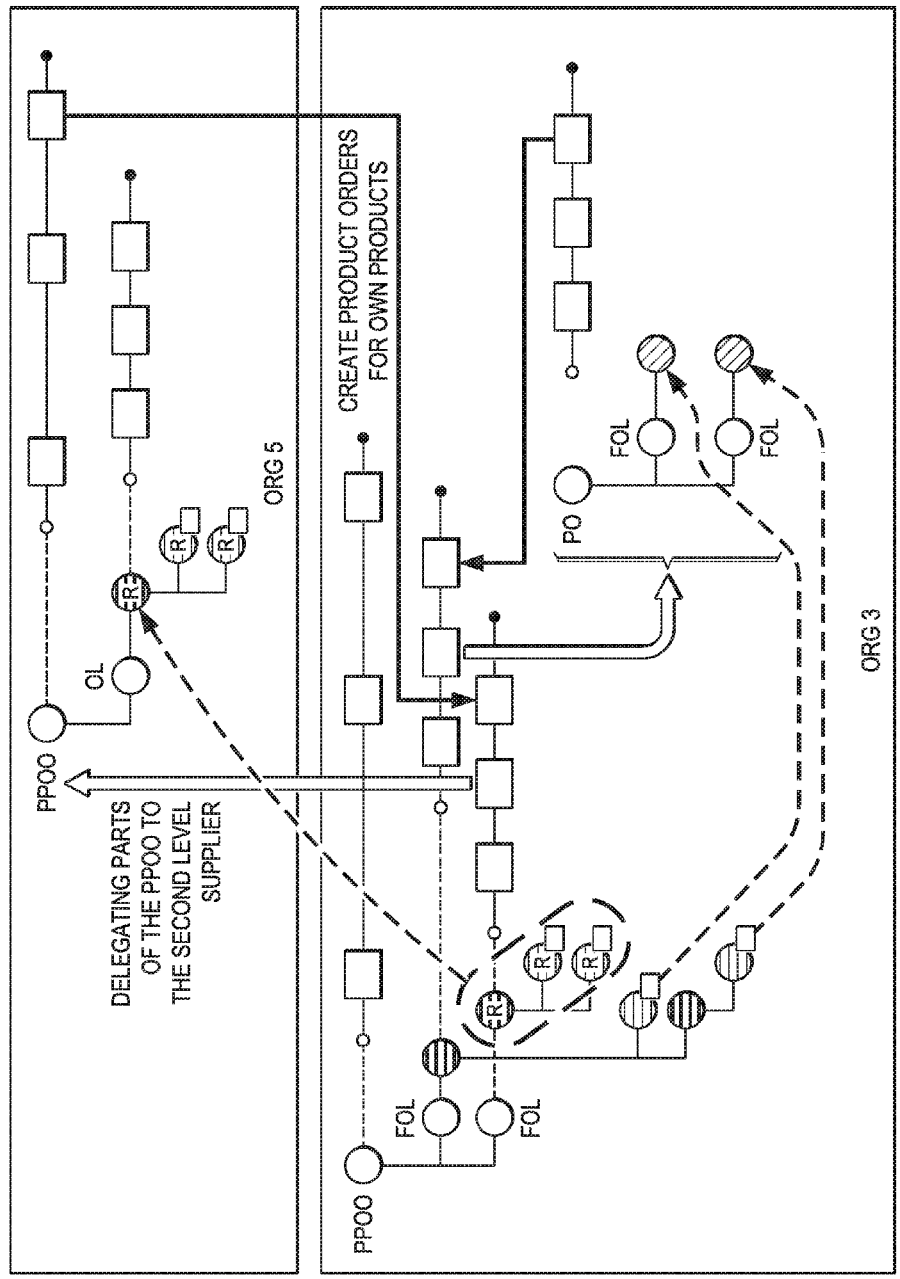
FIG. 27 depicts a diagrammatic representation of an example of product offering relationships according to some embodiments.

In some embodiments, when processing an order, there can be two situations: the first line supplier will fulfill and the purchased product offering (PPO) delegates the PPO order (see, e.g., FIG. 27). In some embodiments, there may be one delegated order per supplier. In some embodiments, all delegated PPOs may first be collected and then a new order (object) is created for the second line suppliers. A technical order line with a new object type (e.g., "Order-Tracker") may be created to represent the delegated order (PPOO) and may contain functional status about the fulfillment of the delegated order. The delegated orders may contain copies of the original PPOs and refer back to the PPOs from which they are created.

Figure 28:
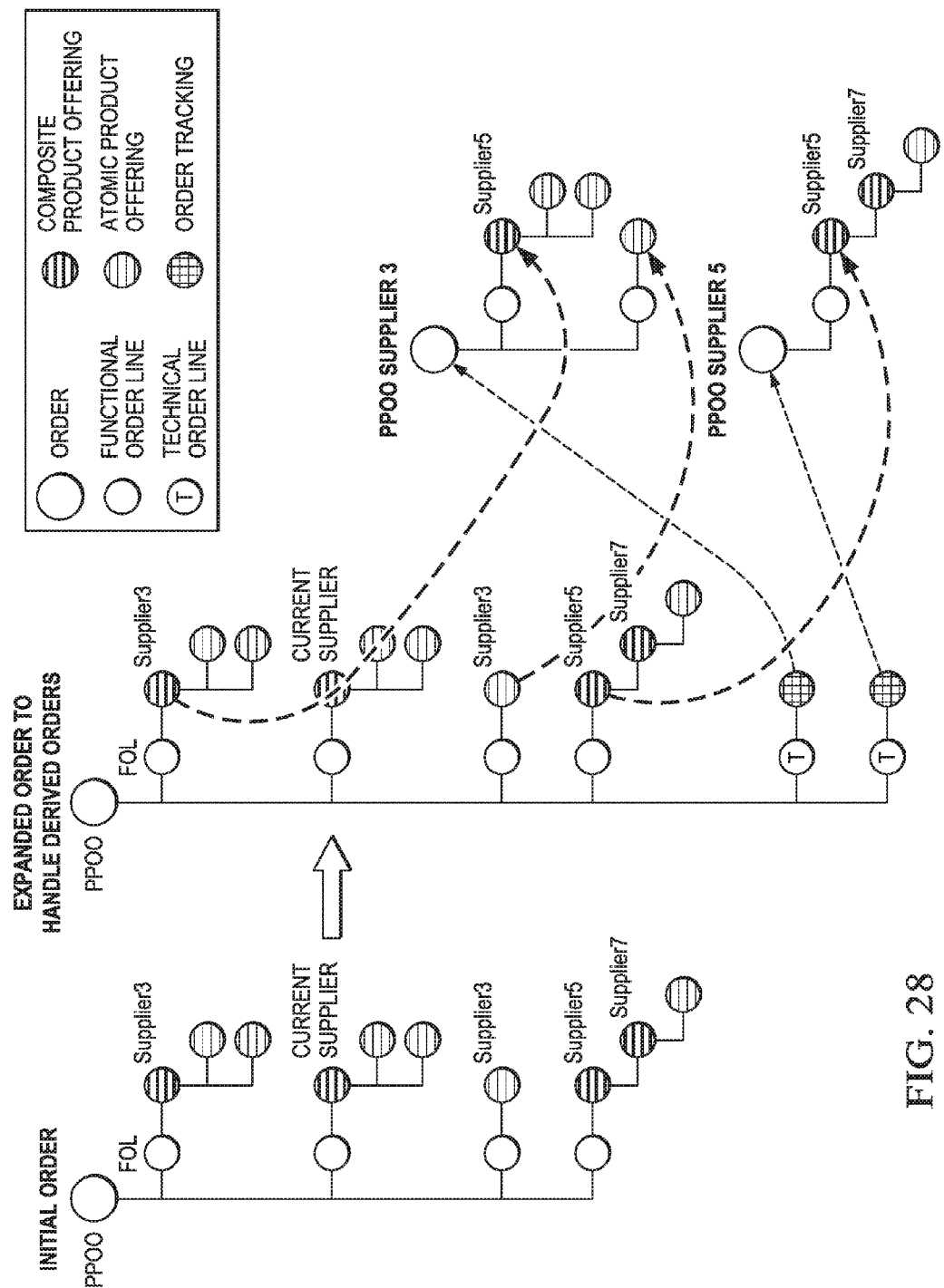
FIG. 28 depicts a diagrammatic representation of an example of product offering relationships according to some embodiments.

The order monitor may refer to an object that one organization uses to track the progress of its purchase orders that it posted to other organizations. Using the above pseudo code as an example, because the OrderTrackerBo is linked to the derived OrderBo, the system can keep both objects in sync with regards to functional status and error conditions (see also, FIG. 28).

In some embodiments, logic behind handling a PPO order may entail the following pattern:
 a. Do I own the product offering?
  i. No: Delegate to the owner of the product offering
  ii. Yes: Is this an atomic product offering?
   1. No: Unwrap the product offering and repeat pattern.
   2. Yes: Create a product order.

As an example, pseudo code for handling a PPO order can include the following:

```
// Starting point for handling the order. Assume the activity is
// triggered from the order object itself.
void processPurchasedProductOfferingOrder(OrderBo orderBo)
{
// For each of the Functional Order Lines, process the PPO object.
for (OrderLineDoc orderLineBo : orderBo.getOrderLines( ))
{
processPurchasedProductOfferingOrderLine(orderBo, orderLineBo);
}
startDelegatedOrders(orderBo)
startProductOrders(orderBo);
}
// For each order line, process the PPO.
void processPurchasedProductOfferingOrderLine(OrderBo orderBo,
OrderLineBo orderLineBo)
{
PurchasedProductOfferingBo ppoBo =
orderLineBo.getStatefulObject( );
// Delegate to a recursive method.
processPurchasedProductOffering(orderBo, orderLineBo, ppoBo);
}
// This method is recursive. It will create a list of PPOs to be
// delegated to owners and will bundle multiple PPOs to the same
// owner in one order.
// This method also creates a list of atomic PPOs that can be
// fulfilled locally with one product order.
void processPurchasedProductOffering(OrderBo orderBo, OrderLineBo
orderLineBo,
PurchasedProductOfferingBo ppoBo)
{
if ( ppoBo.getOrganization != myOrganizaiton )
{
// Add to PPOs to be delegated. This functional orderLine has to
// wait until it is ready.
orderBo.addToDelegationList(orderbo, orderLineBo, ppoBo);
}
else
{
if ( ppoBo.isAtomic( ))
{
// Bundle as much.
orderBo.addToProductOrderList(orderbo, orderLineBo, ppoBo);
} else {
for ( PurchasedProductOfferingBo childPpoBo : ppoBo.getChildren )
{
processPurchasedProductOffering(OrderBo orderBo, orderLine,
childPpoBo);
}
}
}
}
// Trigger all delegated orders and create a technical order line
// per supplier that waits on the completed order.
// Each supplier only gets one order to process.
void startDelegatedOrders(OrderBo orderBo)
{
// Create a DelegatedSupplier object to hold all PPOs for this
// supplier.
for ( DelegatedSupplier supplier :
orderBo.getDelegatedSupplier( ) )
{
OrderBo delegatedOrder = OrderFactory.createOrder( );
delegatedOrder.setTargetOrganziation(supplier.getOrganization));
for ( PurchasedProductOffering delegatingPpoBo :
supplier.getDelegatedPpo( ) )
{
// Clone the PPO to be used in the supplier's order.
PurchasedProductOffering delegatedPpoBo =
PurchasedProductOfferingFactory.clone(delegatingPpoBo);
OrderLineBo orderLineBo = delegatedOrder.createOrderLine( );
orderLine.setStatefulObject(delegatedPpoBo );
}
// This is a OrderBo variant on the previous discussed
// createPurchasedProductOfferingOrder that takes an OrderDoc
PurchasedProductOfferingOrderService.createPurchasedProductOffering
Order(delegatedOrder);
OrderlineBo technicalOrderLine =
orderBo.createTechnicalOrderLine( );
technicalOrderLine.isWaitingOnCompletion(delegatedOrder);
}
}
// This PPO order will only start one product order locally to
// streamline the tracking of the original order.
void startProductOrders(OrderBo orderBo)
{
OrderBo productOrder = OrderFactory.createOrder( );
for ( ProductBo productBo : orderBo.getProducts( ) )
{
OrderLineBo orderLineBo = productOrder.createOrderLine( );
orderLine.setStatefulObject(productBo);
}
ProductOrderService.createProductOrder(productOrder);
OrderlineBo technicalOrderLine =
orderBo.createTechnicalOrderLine( );
technicalOrderLine.isWaitingOnCompletion(productOrder);
}
```

Figure 29:
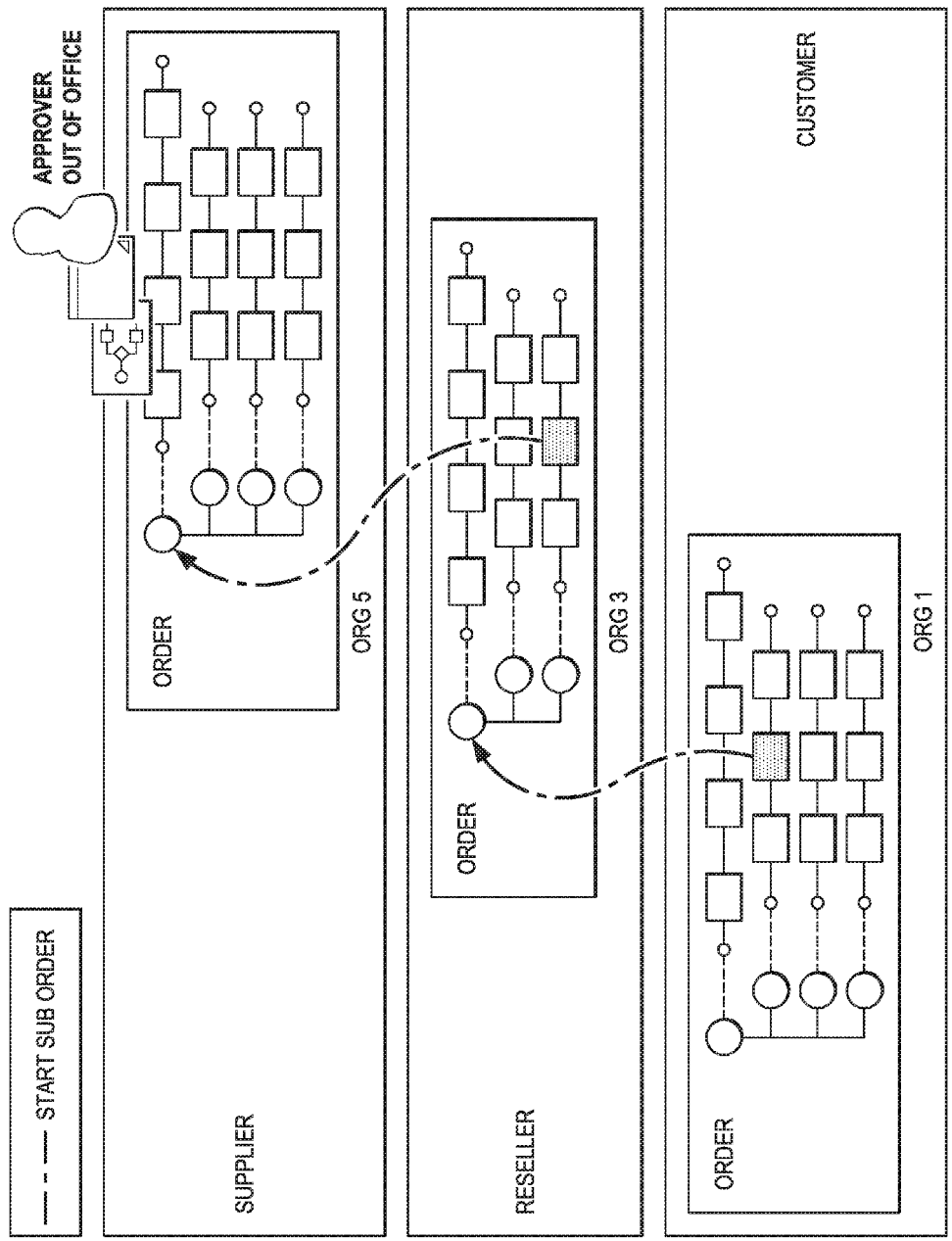
FIG. 29 depicts a diagrammatic representation of an example of product order management according to some embodiments.

When dealing with supply chain issues, tracking and tracing an order can be important. However, an average customer must be prevented from having access to the supplier's organization. Instead, a report back from a sub order to a parent order should be provided. FIG. 29 exemplifies a situation where a customer places an order with a reseller and that reseller delegates the order to one of its suppliers. Suppose the person responsible for approvals at the supplier is out of office for some time and the order is pending longer than the customer is willing to wait.

Figure 30:
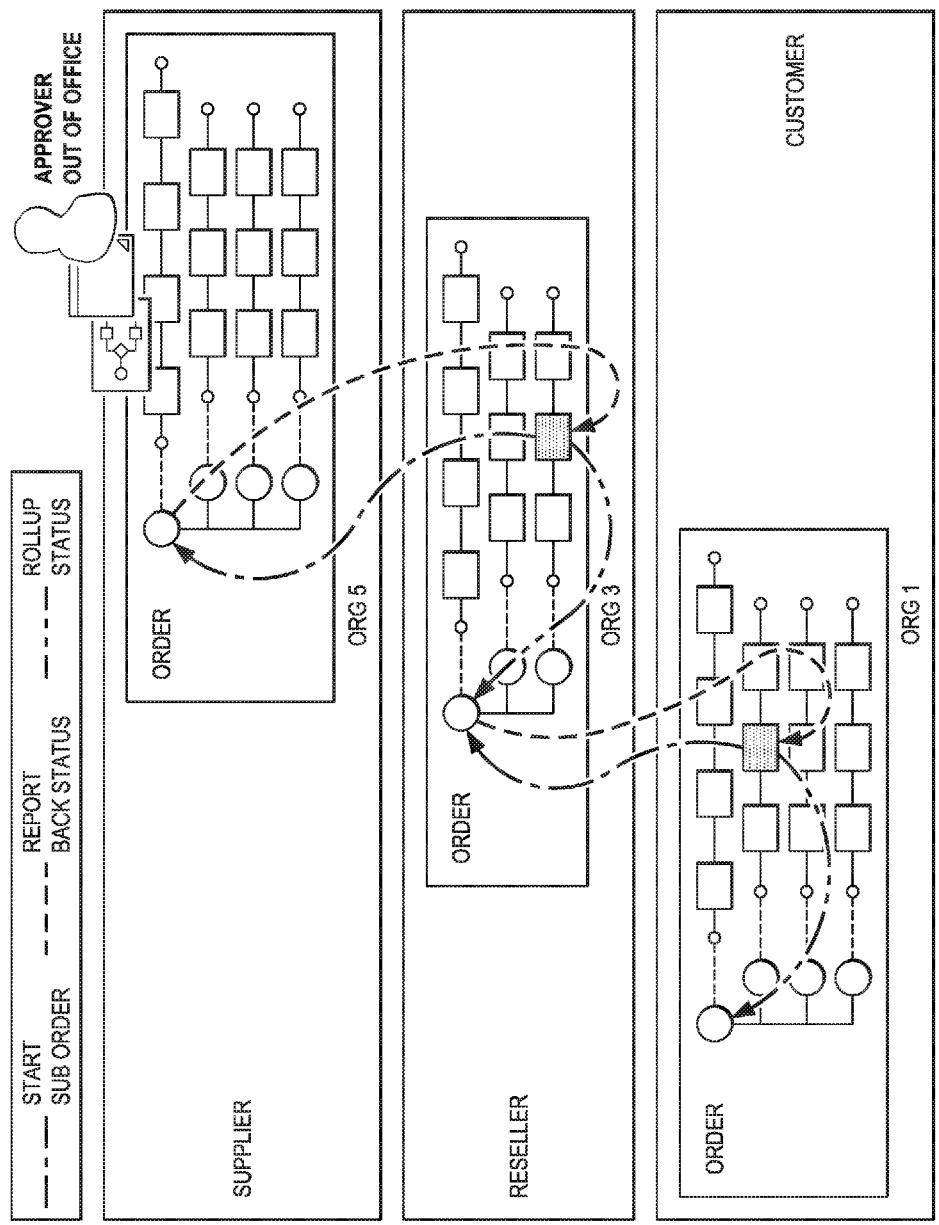
FIG. 30 depicts a diagrammatic representation of an example of product order management according to some embodiments.

As shown in FIG. 30, the supplier order may have a set of functional states that, when changed, are reported back to the parent order line of the reseller order. This order line may store this functional status (and all subsequent updates). The reseller order may be notified when the functional status of one of its order lines changes and may determine what the appropriate status is for the order as a whole. This can be reported back to the parent order line of the customer's order.

Figure 31:
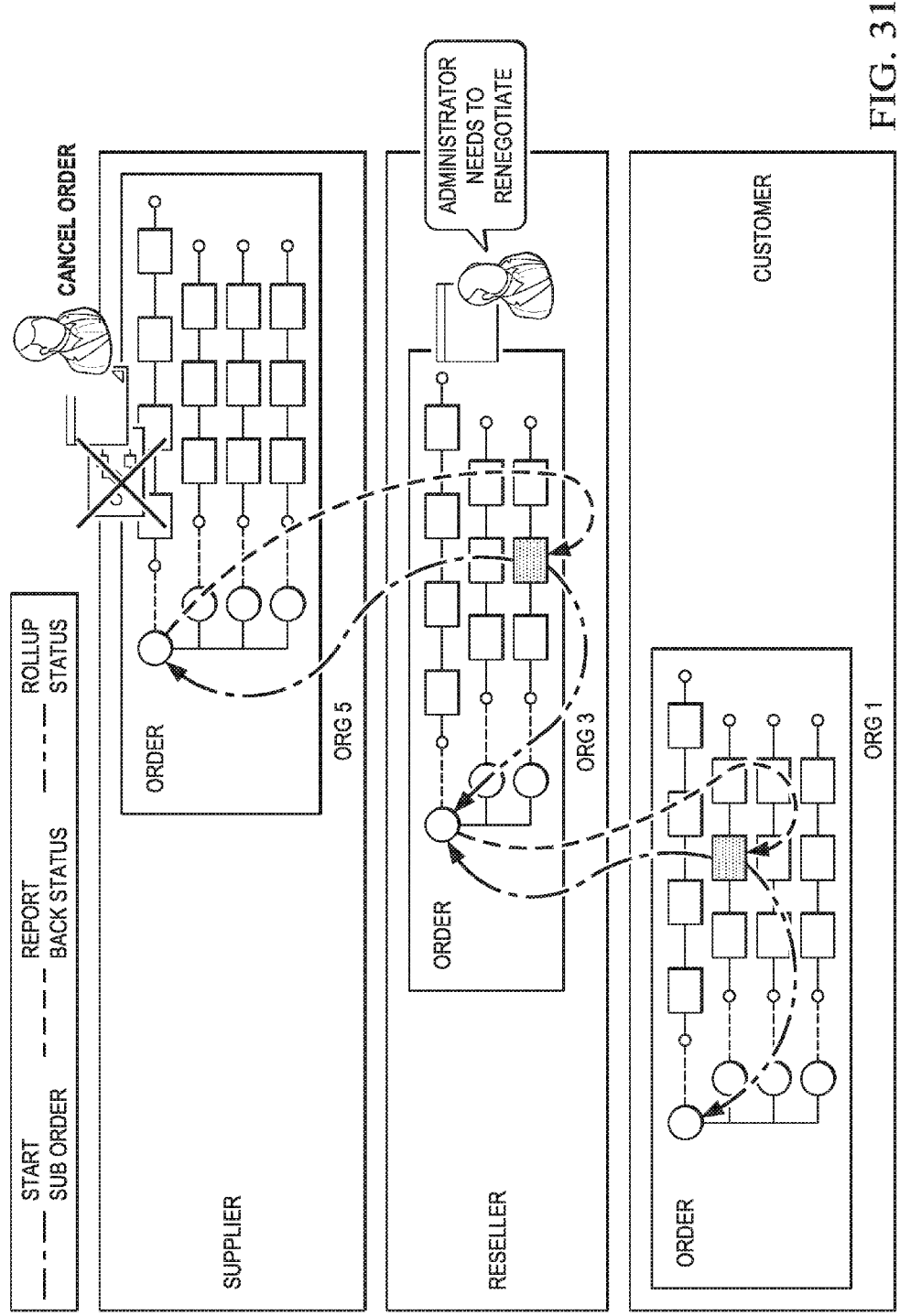
FIG. 31 depicts a diagrammatic representation of an example of product order management according to some embodiments.

As shown in FIG. 31, a special situation may occur when the supplier rejects the order. In this case, the reseller is notified and needs to find an alternative for this product or needs to renegotiate with the rejecting supplier.

Figure 32:
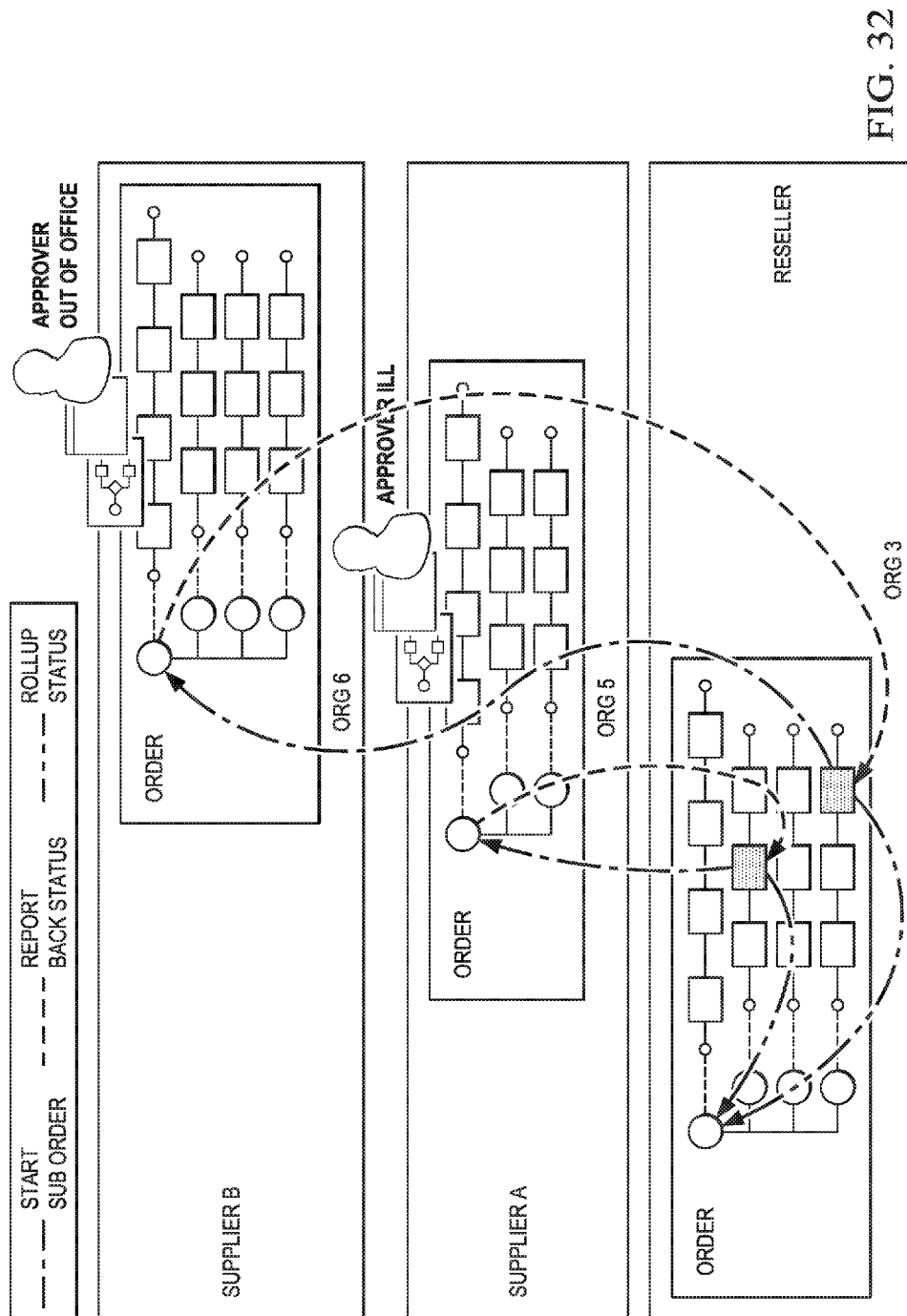
FIG. 32 depicts a diagrammatic representation of an example of product order management according to some embodiments.

As shown in FIG. 32, it is also possible that an order has multiple sub orders in a functional state that indicates that there are issues. On a change of functional status of an order line, an order may interrogate all its order lines to determine what the resulting functional state of the order will be. A special case is if the customer is waiting longer than he/she is willing and cancels the order. In this case, all corresponding sub orders or a portion thereof could be cancelled, depending on contractual agreements.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

According to an exemplary embodiment, there is provided a provisioning system for a multi-tenant platform including a presentation component operably coupled to a supervisory component and a registry database and configured to present registry information in accordance with criteria defined in one or more rules and receive requests to access the registry information. The one or more rules define a supply chain including multiple of a plurality of tenants in the multi-tenancy system, the supervisory component configured to automatically implement the supply chain in response to the request.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by any means. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for multi-tenant supply chain provisioning, the method comprising:

receiving, via a user interface of a multi-tenant supply chain provisioning system operating on a multi-tenant computing platform embodied on a non-transitory computer memory, an indication that a user has placed an item from an electronic catalog into a container, the electronic catalog containing product offerings by multiple tenants of the multitenant computing platform, the multi-tenant supply chain provisioning system having a partition mechanism that prevents data migration between the multiple tenants, the user representing a first tenant of the multiple tenants, the item offered by a second tenant of the multiple tenants, the item offered by the second tenant accessible through the electronic catalog by the first tenant in accordance with one or more rules associated with the second tenant;

in response, the multi-tenant supply chain provisioning system creating an order containing the item offered by the second tenant and validating the order, the validating comprising determining, by the multitenant supply chain provisioning system, whether a valid agreement exists between the first tenant and the second tenant that provides the first tenant with access to the item offered by the second tenant;

responsive to the order being validated, the multi-tenant supply chain provisioning system committing the order; and responsive to the order being validated and committed, the multi-tenant supply chain provisioning system performing:

decomposing the order containing the item offered by the second tenant into multiple purchased product offerings, the multiple purchased product offerings including a first product offering by the second tenant and a second product offering by a third tenant;

creating a sub order for the second product offering by the third tenant; and delegating fulfillment of the second product offering to the third tenant, the second tenant and the third tenant in a supply chain for the order, the supply chain managed by the multi-tenant supply chain provisioning system.

2. The method according to claim 1, wherein the validating further comprises determining whether the second product offering by the third tenant invalidates the first product offering by the second tenant.

3. The method according to claim 1, wherein delegating fulfillment of the second product offering to the third tenant comprises:

creating a sub order containing the second product offering; and communicating the sub order to the third tenant.

4. The method according to claim 3, further comprising:

receiving, by the multi-tenant supply chain provisioning system, a response from the third tenant rejecting the sub order; and the multi-tenant supply chain provisioning system communicating with the second tenant relating to finding an alternative fulfillment for the second product offering or renegotiating with the third tenant for the fulfillment of the second product offering.

5. The method according to claim 1, wherein the second tenant acts as a reseller of the item, wherein the first tenant acts as a customer of the reseller, and wherein the third tenant acts as a supplier for the reseller.

6. The method according to claim 1, wherein the order contains a composite product offering that has no direct relation to a product specification of the item.

7. The method according to claim 1, wherein the order is committed automatically when the item is placed in the container or when the item is checked out from the container by the user.

8. A computer program product comprising a non-transitory computer-readable medium storing instructions which when translated by a processor cause a multi-tenant supply chain provisioning system operating on a multi-tenant computing platform to perform:

receiving, via a user interface, an indication that a user has placed an item from an electronic catalog into a container, the electronic catalog containing product offerings by multiple tenants of the multi-tenant computing platform, the multi-tenant supply chain provisioning system having a partition mechanism that prevents data migration between the multiple tenants, the user representing a first tenant of the multiple tenants, the item offered by a second tenant of the multiple tenants, the item offered by the second tenant accessible through the electronic catalog by the first tenant in accordance with one or more rules associated with the second tenant;

in response, creating an order offered by the second tenant containing the item and validating the order, the validating comprising determining whether a valid agreement exists between the first tenant and the second tenant that provides the first tenant with access to the item offered by the second tenant;

responsive to the order being validated, committing the order; and responsive to the order being validated and committed:

decomposing the order containing the item offered by the second tenant into multiple purchased product offerings, the multiple purchased product offerings including a first product offering by the second tenant and a second product offering by a third tenant;

creating a sub order for the second product offering by the third tenant; and delegating fulfillment of the second product offering to the third tenant, the second tenant and the third tenant in a supply chain for the order, the supply chain managed by the multi-tenant supply chain provisioning system.

9. The computer program product of claim 8, wherein the validating further comprises determining whether the second product offering by the third tenant invalidates the first product offering by the second tenant.

10. The computer program product of claim 8, wherein delegating fulfillment of the second product offering to the third tenant comprises:

creating a sub order containing the second product offering; and communicating the sub order to the third tenant.

11. The computer program product of claim 10, wherein the instructions when translated by the at least one processor further cause the multi-tenant supply chain provisioning system to perform:

receiving a response from the third tenant rejecting the sub order; and communicating with the second tenant relating to finding an alternative fulfillment for the second product offering or renegotiating with the third tenant for the fulfillment of the second product offering.

12. The computer program product of claim 8, wherein the order contains a composite product offering that has no direct relation to a product specification of the item.

13. The computer program product of claim 8, wherein the order is committed automatically when the item is placed in the container or when the item is checked out from the container by the user.

14. A system for multi-tenant supply chain provisioning, the system comprising:
   a processor;
   a non-transitory computer-readable medium; and
   stored instructions which when translated by the processor cause a multi-tenant supply chain provisioning system operating on a multi-tenant computing platform to perform:
      receiving, via a user interface, an indication that a user has placed an item from an electronic catalog into a container, the electronic catalog containing product offerings by multiple tenants of the multi-tenant computing platform, the multi-tenant supply chain provisioning system having a partition mechanism that prevents data migration between the multiple tenants, the user representing a first tenant of the multiple tenants, the item offered by a second tenant of the multiple tenants, the item offered by the second tenant accessible through the electronic catalog by the first tenant in accordance with one or more rules associated with the second tenant;
      in response, creating an order containing the item offered by the second tenant and validating the order, the validating comprising determining whether a valid agreement exists between the first tenant and the second tenant that provides the first tenant with access to the item offered by the second tenant;
      responsive to the order being validated, committing the order; and
      responsive to the order being validated and committed:
      decomposing the order containing the item offered by the second tenant into multiple purchased product offerings, the multiple purchased product offerings including a first product offering by the second tenant and a second product offering by a third tenant;
         creating a sub order for the second product offering by the third tenant; and
         delegating fulfillment of the second product offering to the third tenant, the second tenant and the third tenant in a supply chain for the order, the supply chain managed by the multi-tenant supply chain provisioning system.

15. The system of claim 14, wherein the validating further comprises determining whether the second product offering by the third tenant invalidates the first product offering by the second tenant.

16. The system of claim 14, wherein delegating fulfillment of the second product offering to the third tenant comprises:
   creating a sub order containing the second product offering; and
   communicating the sub order to the third tenant.

17. The system of claim 16, wherein the instructions when translated by the at least one processor further cause the multi-tenant supply chain provisioning system to perform:
   receiving a response from the third tenant rejecting the sub order; and
   communicating with the second tenant relating to finding an alternative fulfillment for the second product offering or renegotiating with the third tenant for the fulfillment of the second product offering.

18. The system of claim 14, wherein the second tenant acts as a reseller of the item, wherein the first tenant acts as a customer of the reseller, and wherein the third tenant acts as a supplier for the reseller.

19. The system of claim 14, wherein the order contains a composite product offering that has no direct relation to a product specification of the item.

20. The system of claim 14, wherein the order is committed automatically when the item is placed in the container or when the item is checked out from the container by the user.

* * * * *